US012614241B2

(12) United States Patent
Child et al.

(10) Patent No.: US 12,614,241 B2
(45) **Date of Patent: *Apr. 28, 2026**

(54) SYSTEMS AND METHODS FOR ELECTRONIC SIGNATURE TRACKING

(71) Applicant: Leonardo US Cyber and Security Solutions, LLC, Greensboro, NC (US)

(72) Inventors: Todd Child, Greensboro, NC (US); Bernard Howe, Greensboro, NC (US)

(73) Assignee: Leonardo US Cyber and Security Solutions, LLC

( * ) Notice: Subject to any disclaimer, the term of this patent is extended or adjusted under 35 U.S.C. 154(b) by 0 days.

This patent is subject to a terminal disclaimer.

(21) Appl. No.: 18/439,035

(22) Filed: Feb. 12, 2024

(65) Prior Publication Data

US 2024/0185371 A1 Jun. 6, 2024

Related U.S. Application Data

(63) Continuation of application No. 18/099,377, filed on Jan. 20, 2023, now Pat. No. 11,941,716, which is a continuation of application No. 17/546,334, filed on Dec. 9, 2021, now Pat. No. 12,469,097.

(60) Provisional application No. 63/125,557, filed on Dec. 15, 2020.

(51) Int. Cl.
*G06Q 50/26* (2024.01)

(52) U.S. Cl.
CPC .................................. *G06Q 50/265* (2013.01)

(58) Field of Classification Search
CPC .... G06Q 50/265; G06V 10/811; G06V 20/52; G06V 20/625
See application file for complete search history.

(56) References Cited

U.S. PATENT DOCUMENTS

| | | | |
|---|---|---|---|
| 3,656,111 | A | 4/1972 | Royster, Sr. |
| 4,843,463 | A | 6/1989 | Michetti |
| 6,140,941 | A | 10/2000 | Dwyer et al. |
| 6,340,935 | B1 | 1/2002 | Hall |
| 6,538,580 | B2 | 3/2003 | Bostrom |

(Continued)

FOREIGN PATENT DOCUMENTS

| | | | |
|---|---|---|---|
| AU | 2013201309 | B2 | 8/2014 |
| CA | 2620630 | C | 9/2014 |

(Continued)

OTHER PUBLICATIONS

Makarov, Aleksej, M. Španović, and V. Lukić. “Authenticating vehicles and drivers in motion based on computer vision and RFID tags.” 2012 IEEE 10th Jubilee International Symposium on Intelligent Systems and Informatics. IEEE, 2012. (Year: 2012).*

(Continued)

*Primary Examiner* — Corey Russ
(74) *Attorney, Agent, or Firm* — Adams & Reese, LLP

(57) ABSTRACT

A system and method to identify and track one or more targets of interest. The system may include a plurality of collection systems to capture information related to visual identifiers and/or electronic signatures associated with targets in selected locations. The system may further include an intelligence system to determine a target of interest based on the information related to visual identifiers and/or electronic signatures and to track the target of interest.

20 Claims, 11 Drawing Sheets

(56) References Cited

U.S. PATENT DOCUMENTS

| | | | |
|---|---|---|---|
| 6,650,765 | B1 | 11/2003 | Alves |
| 6,754,368 | B1 | 6/2004 | Cohen |
| 6,844,841 | B1 | 1/2005 | Masciulli |
| 6,922,138 | B2 | 7/2005 | Melvin |
| 6,959,869 | B2 | 11/2005 | Tsikos et al. |
| 6,982,654 | B2 | 1/2006 | Rau et al. |
| 7,046,169 | B2 | 5/2006 | Bucholz et al. |
| 7,173,526 | B1 | 2/2007 | Monroe |
| 7,227,974 | B2 | 6/2007 | Kamijo et al. |
| 7,342,511 | B2 | 3/2008 | Schuette |
| 7,344,284 | B2 | 3/2008 | Lynam et al. |
| 7,382,280 | B2 | 6/2008 | Long |
| 7,460,028 | B2 | 12/2008 | Garibotto et al. |
| 7,465,108 | B2 | 12/2008 | Brown |
| 7,482,910 | B2 | 1/2009 | Melvin |
| 7,504,965 | B1 | 3/2009 | Windover et al. |
| 7,535,793 | B2 | 5/2009 | Frantz |
| 7,634,662 | B2 | 12/2009 | Monroe |
| 7,825,829 | B2 | 11/2010 | Madsen |
| 7,868,912 | B2 | 1/2011 | Venetianer |
| 7,889,931 | B2 | 2/2011 | Webb et al. |
| 7,920,626 | B2 | 4/2011 | Fernandez |
| 8,068,154 | B2 | 11/2011 | Jacob et al. |
| 8,117,090 | B2 | 2/2012 | Romero |
| 8,243,140 | B1 | 8/2012 | Howe |
| 8,408,772 | B2 | 4/2013 | Li |
| 8,447,112 | B2 | 5/2013 | Paul et al. |
| 8,531,523 | B2 | 9/2013 | Anderson et al. |
| 8,666,801 | B2 | 3/2014 | Cho |
| 8,693,733 | B1 | 4/2014 | Harrison |
| 8,704,889 | B2 | 4/2014 | Hofman |
| 8,736,678 | B2 | 5/2014 | Miller, II |
| 8,742,908 | B2 | 6/2014 | Boudy |
| 8,774,465 | B2 | 7/2014 | Christopulos et al. |
| 8,781,169 | B2 | 7/2014 | Jackson et al. |
| 8,817,098 | B2 | 8/2014 | Millar |
| 8,953,044 | B2 | 2/2015 | Wu et al. |
| 8,983,137 | B2 | 3/2015 | Hradetzky |
| 9,058,619 | B2 | 6/2015 | Nandakumar et al. |
| 9,141,503 | B1 | 9/2015 | Chen |
| 9,158,954 | B2 | 10/2015 | Thuries et al. |
| 9,171,382 | B2 | 10/2015 | Nerayoff et al. |
| 9,245,203 | B2 | 1/2016 | Hofman et al. |
| 9,280,895 | B2 | 3/2016 | Wang et al. |
| 9,327,685 | B1 | 5/2016 | Wooten |
| 9,342,934 | B2 | 5/2016 | Chen |
| 9,386,421 | B2 | 7/2016 | Bolon et al. |
| 9,426,345 | B1 | 8/2016 | Turner, Jr. et al. |
| 9,436,880 | B2 | 9/2016 | Bos et al. |
| 9,471,838 | B2 | 10/2016 | Miller et al. |
| 9,471,849 | B2 | 10/2016 | Gurwicz |
| 9,477,917 | B1 | 10/2016 | Koch |
| 9,491,420 | B2 | 11/2016 | Mimar |
| 9,495,869 | B2 | 11/2016 | Bhogal et al. |
| 9,497,393 | B2 | 11/2016 | Reed et al. |
| 9,538,060 | B1 | 1/2017 | Cilia |
| 9,542,609 | B2 | 1/2017 | Wu et al. |
| 9,594,158 | B2 | 3/2017 | Abl |
| 9,607,510 | B1 | 3/2017 | DeLorean |
| 9,652,666 | B2 | 5/2017 | Nerayoff et al. |
| 9,685,084 | B2 | 6/2017 | Scholl et al. |
| 9,715,703 | B2 | 7/2017 | Robinson et al. |
| 9,779,309 | B1 | 10/2017 | Fink et al. |
| 9,796,331 | B2 | 10/2017 | Karner et al. |
| 9,818,157 | B2 | 11/2017 | McCall et al. |
| 9,846,883 | B2 | 12/2017 | Angell et al. |
| 9,858,493 | B2 | 1/2018 | Tseng |
| 9,911,297 | B2 | 3/2018 | Lundy |
| 9,972,230 | B1 | 5/2018 | DeLorean |
| 9,990,376 | B2 | 6/2018 | Voeller et al. |
| 9,996,861 | B2 | 6/2018 | Ryan et al. |
| 10,027,361 | B2 | 7/2018 | Griffin |
| 10,032,212 | B2 | 7/2018 | Winkelman et al. |
| 10,055,906 | B1 | 8/2018 | Fournier et al. |
| 10,057,713 | B1 | 8/2018 | Rackley, III et al. |
| 10,089,869 | B1 | 10/2018 | Makled et al. |
| 10,121,172 | B2 | 11/2018 | Hudson |
| 10,127,437 | B2 | 11/2018 | Bhanu et al. |
| 10,140,488 | B1 | 11/2018 | Bondarenko et al. |
| 10,152,858 | B2 | 12/2018 | Boykin |
| 10,164,974 | B2 | 12/2018 | Spencer et al. |
| 10,198,954 | B2 | 2/2019 | Holtzman et al. |
| 10,217,034 | B2 | 2/2019 | Hoshino |
| 10,223,609 | B2 | 3/2019 | Bhanu |
| 10,373,226 | B1 | 8/2019 | Russell |
| 10,417,816 | B2 | 9/2019 | Satzoda et al. |
| 10,559,200 | B1 | 2/2020 | Langley et al. |
| 10,562,540 | B2 | 2/2020 | Van Wiemeersch et al. |
| 10,691,968 | B2 | 6/2020 | Blais-Morin et al. |
| 10,872,524 | B2 | 12/2020 | Kienitz et al. |
| 10,915,742 | B2 | 2/2021 | Carey |
| 11,030,892 | B1 | 6/2021 | Langley et al. |
| 11,080,533 | B2 | 8/2021 | Camilus et al. |
| 11,243,959 | B1 | 2/2022 | Gilboa |
| 11,941,716 | B2 | 3/2024 | Child et al. |
| 2002/0089157 | A1 | 7/2002 | Breed et al. |
| 2002/0186148 | A1 | 12/2002 | Trajkovic et al. |
| 2003/0131011 | A1* | 7/2003 | Haunschild ............ G06Q 10/10 |
| 2004/0143602 | A1 | 7/2004 | Ruiz et al. |
| 2004/0218052 | A1 | 11/2004 | DiDomenico et al. |
| 2005/0012817 | A1* | 1/2005 | Hampapur ............. H04N 7/185 348/E7.086 |
| 2005/0065711 | A1 | 3/2005 | Dahlgren et al. |
| 2005/0140525 | A1 | 6/2005 | Tomita et al. |
| 2005/0162515 | A1 | 7/2005 | Venetianer et al. |
| 2006/0007308 | A1 | 1/2006 | Ide |
| 2006/0028556 | A1 | 2/2006 | Bunn et al. |
| 2006/0030985 | A1 | 2/2006 | Lawida et al. |
| 2006/0106659 | A1 | 5/2006 | Santos et al. |
| 2006/0109083 | A1 | 5/2006 | Rathus et al. |
| 2006/0180647 | A1 | 8/2006 | Hansen |
| 2006/0269105 | A1 | 11/2006 | Langlinais |
| 2006/0278705 | A1 | 12/2006 | Hedley et al. |
| 2007/0008129 | A1 | 1/2007 | Soliman |
| 2007/0009136 | A1 | 1/2007 | Pawlenko |
| 2007/0069921 | A1 | 3/2007 | Sefton |
| 2007/0112620 | A1 | 5/2007 | Johnson |
| 2007/0208492 | A1 | 9/2007 | Downs et al. |
| 2007/0229307 | A1 | 10/2007 | Pawlenko et al. |
| 2007/0291118 | A1 | 12/2007 | Shu et al. |
| 2008/0045245 | A1* | 2/2008 | Billmaier ................ H04W 4/02 455/457 |
| 2008/0117296 | A1 | 5/2008 | Egnal et al. |
| 2008/0285803 | A1 | 11/2008 | Madsen |
| 2009/0088924 | A1 | 4/2009 | Coffee et al. |
| 2009/0161913 | A1 | 6/2009 | Son |
| 2010/0066537 | A1 | 3/2010 | Weller et al. |
| 2010/0088123 | A1 | 4/2010 | McCall et al. |
| 2010/0195871 | A1 | 8/2010 | Simon |
| 2010/0245582 | A1 | 9/2010 | Harel |
| 2010/0283662 | A1 | 11/2010 | Fox |
| 2011/0053559 | A1 | 3/2011 | Klein |
| 2011/0134240 | A1 | 6/2011 | Anderson et al. |
| 2011/0228085 | A1 | 9/2011 | Hofman |
| 2011/0228253 | A1 | 9/2011 | Batten et al. |
| 2011/0267222 | A1 | 11/2011 | Craig |
| 2011/0313644 | A1 | 12/2011 | Grassi |
| 2012/0106801 | A1* | 5/2012 | Jackson ................. G08G 1/205 382/105 |
| 2012/0140079 | A1 | 6/2012 | Millar |
| 2012/0155712 | A1 | 6/2012 | Paul et al. |
| 2013/0082828 | A1 | 4/2013 | Furey et al. |
| 2013/0093886 | A1 | 4/2013 | Rothschild |
| 2013/0129152 | A1 | 5/2013 | Rodriguez Serrano et al. |
| 2013/0132166 | A1 | 5/2013 | Wu et al. |
| 2013/0135468 | A1 | 5/2013 | Kim |
| 2013/0282448 | A1 | 10/2013 | Rydbeck et al. |
| 2013/0303189 | A1* | 11/2013 | Bennett ............... H04W 12/033 455/456.2 |
| 2013/0306728 | A1 | 11/2013 | Thuries et al. |
| 2013/0308003 | A1 | 11/2013 | Raghavan |
| 2013/0325629 | A1 | 12/2013 | Harrison |
| 2014/0046800 | A1 | 2/2014 | Chen |
| 2014/0066089 | A1 | 3/2014 | Monks |

(56) References Cited

U.S. PATENT DOCUMENTS

| | | | |
|---|---|---|---|
| 2014/0093125 A1 | 4/2014 | Hradetzky | |
| 2014/0126779 A1 | 5/2014 | Duda | |
| 2014/0139660 A1* | 5/2014 | Zhu | G06V 10/46 382/103 |
| 2014/0159925 A1 | 6/2014 | Mimeault et al. | |
| 2014/0160283 A1 | 6/2014 | Hofman et al. | |
| 2014/0225719 A1 | 8/2014 | Kesavan et al. | |
| 2014/0241585 A1 | 8/2014 | Zafiroglu | |
| 2014/0254866 A1 | 9/2014 | Jankowski et al. | |
| 2014/0254877 A1 | 9/2014 | Jankowski et al. | |
| 2014/0254878 A1 | 9/2014 | Jankowski et al. | |
| 2014/0328512 A1 | 11/2014 | Gurwicz | |
| 2014/0334684 A1 | 11/2014 | Strimling | |
| 2015/0049914 A1* | 2/2015 | Alves | G06V 20/63 382/105 |
| 2015/0054639 A1 | 2/2015 | Rosen | |
| 2015/0054676 A1 | 2/2015 | Vinski et al. | |
| 2015/0113012 A1 | 4/2015 | Silver | |
| 2015/0119069 A1 | 4/2015 | Harris et al. | |
| 2015/0123794 A1 | 5/2015 | Hamalainen et al. | |
| 2015/0138001 A1 | 5/2015 | Davies | |
| 2015/0138332 A1 | 5/2015 | Cheng et al. | |
| 2015/0149465 A1 | 5/2015 | Unser et al. | |
| 2015/0154669 A1 | 6/2015 | Wu et al. | |
| 2015/0205868 A1 | 7/2015 | Boncyk et al. | |
| 2015/0294373 A1 | 10/2015 | Schuh | |
| 2015/0310293 A1 | 10/2015 | Dehart | |
| 2015/0317687 A1 | 11/2015 | Ramesh et al. | |
| 2015/0348342 A1* | 12/2015 | Baxley | H04B 17/318 340/5.81 |
| 2015/0356498 A1 | 12/2015 | Casanova | |
| 2015/0381946 A1 | 12/2015 | Renkis | |
| 2015/0381948 A1 | 12/2015 | Renkis | |
| 2016/0021344 A1 | 1/2016 | Renkis | |
| 2016/0098864 A1 | 4/2016 | Nawrocki | |
| 2016/0110759 A1 | 4/2016 | Polehn et al. | |
| 2016/0112461 A1 | 4/2016 | Othmer | |
| 2016/0124071 A1 | 5/2016 | Baxley et al. | |
| 2016/0127931 A1 | 5/2016 | Baxley | |
| 2016/0266579 A1 | 9/2016 | Chen | |
| 2016/0343252 A1 | 11/2016 | Davies et al. | |
| 2016/0344979 A1 | 11/2016 | Renkis | |
| 2016/0360181 A1 | 12/2016 | Drako | |
| 2017/0018170 A1* | 1/2017 | Sayavong | G06F 16/951 |
| 2017/0032666 A1 | 2/2017 | Pretorius et al. | |
| 2017/0048376 A1 | 2/2017 | Logan | |
| 2017/0053171 A1 | 2/2017 | Buehler | |
| 2017/0061506 A1 | 3/2017 | Dow et al. | |
| 2017/0124395 A1 | 5/2017 | Cohen et al. | |
| 2017/0126648 A1 | 5/2017 | Bond et al. | |
| 2017/0131202 A1 | 5/2017 | McClintock et al. | |
| 2017/0140237 A1 | 5/2017 | Voeller et al. | |
| 2017/0186317 A1 | 6/2017 | Franklin et al. | |
| 2017/0193810 A1 | 7/2017 | Cao et al. | |
| 2017/0202185 A1 | 7/2017 | Trumbull et al. | |
| 2017/0206559 A1* | 7/2017 | Bakshi | H04W 4/021 |
| 2017/0300758 A1 | 10/2017 | Renkis | |
| 2017/0308964 A1 | 10/2017 | Morris et al. | |
| 2017/0330455 A1 | 11/2017 | Kikuchi et al. | |
| 2017/0339529 A1 | 11/2017 | Buttolo et al. | |
| 2017/0357662 A1 | 12/2017 | Knany et al. | |
| 2017/0357881 A1 | 12/2017 | Hoshino | |
| 2017/0365105 A1 | 12/2017 | Rao et al. | |
| 2017/0372143 A1 | 12/2017 | Barcus et al. | |
| 2017/0374324 A1 | 12/2017 | Loftus | |
| 2018/0032590 A1 | 2/2018 | Recavarren | |
| 2018/0072177 A1 | 3/2018 | Tremblay | |
| 2018/0096595 A1 | 4/2018 | Janzen et al. | |
| 2018/0103348 A1 | 4/2018 | Malone | |
| 2018/0107528 A1 | 4/2018 | Vizer et al. | |
| 2018/0107892 A1 | 4/2018 | Istenes | |
| 2018/0137356 A1 | 5/2018 | Nerayoff et al. | |
| 2018/0144382 A1 | 5/2018 | Makke et al. | |
| 2018/0165935 A1* | 6/2018 | VanBlon | G08B 13/2494 |
| 2018/0174457 A1 | 6/2018 | Taylor | |
| 2018/0197416 A1 | 7/2018 | Hyde et al. | |
| 2018/0211115 A1 | 7/2018 | Klein | |
| 2018/0211116 A1 | 7/2018 | Modi et al. | |
| 2018/0211117 A1 | 7/2018 | Ratti | |
| 2018/0247519 A1 | 8/2018 | Bekanich | |
| 2018/0253805 A1 | 9/2018 | Kelly et al. | |
| 2018/0300578 A1 | 10/2018 | Wilbert et al. | |
| 2018/0328757 A1 | 11/2018 | Chan et al. | |
| 2018/0349699 A1 | 12/2018 | O'Connell et al. | |
| 2018/0350230 A1 | 12/2018 | Kienitz et al. | |
| 2018/0357247 A1 | 12/2018 | Siminoff et al. | |
| 2019/0031146 A1 | 1/2019 | Etonye | |
| 2019/0039463 A1 | 2/2019 | Moghe et al. | |
| 2019/0043355 A1 | 2/2019 | Ferguson et al. | |
| 2019/0050634 A1 | 2/2019 | Nerayoff et al. | |
| 2019/0050652 A1 | 2/2019 | Baker et al. | |
| 2019/0051142 A1 | 2/2019 | Wiles | |
| 2019/0057601 A1 | 2/2019 | Watanabe et al. | |
| 2019/0087864 A1 | 3/2019 | Hacker | |
| 2019/0147260 A1 | 5/2019 | May | |
| 2019/0147306 A1 | 5/2019 | Hoshino | |
| 2019/0163982 A1 | 5/2019 | Block | |
| 2019/0244498 A1* | 8/2019 | Dumas | G08B 13/19656 |
| 2019/0294890 A1* | 9/2019 | Kanga | G06T 7/251 |
| 2019/0311327 A1 | 10/2019 | Habbaba et al. | |
| 2019/0325230 A1 | 10/2019 | Nadler | |
| 2019/0329421 A1 | 10/2019 | Deyle et al. | |
| 2020/0097735 A1 | 3/2020 | Altuev | |
| 2020/0104566 A1 | 4/2020 | Yamada et al. | |
| 2020/0111350 A1 | 4/2020 | Julian et al. | |
| 2020/0120266 A1 | 4/2020 | Kleinbeck | |
| 2020/0126407 A1* | 4/2020 | Sakito | G06V 20/52 |
| 2020/0162701 A1* | 5/2020 | Nixon | H04N 7/188 |
| 2020/0211345 A1* | 7/2020 | Gordon-Carroll | G06F 16/487 |
| 2020/0265258 A1 | 8/2020 | Blais-Morin et al. | |
| 2020/0320573 A1 | 10/2020 | Harrison | |
| 2020/0410251 A1 | 12/2020 | Petrey, Jr. | |
| 2021/0019645 A1 | 1/2021 | Petrey, Jr. | |
| 2021/0026019 A1 | 1/2021 | Gahagan et al. | |
| 2021/0044959 A1 | 2/2021 | Beaurepaire | |
| 2021/0192943 A1 | 6/2021 | Neff | |
| 2021/0225161 A1 | 7/2021 | Horn | |
| 2021/0326563 A1* | 10/2021 | Kossor | H04W 4/90 |
| 2021/0334549 A1 | 10/2021 | Ekkel | |
| 2021/0398298 A1* | 12/2021 | Kisara | G06T 7/292 |
| 2022/0100999 A1* | 3/2022 | Hill | G08G 1/0116 |
| 2022/0141426 A1 | 5/2022 | Kim et al. | |
| 2022/0148320 A1 | 5/2022 | Alakarhu | |
| 2022/0188953 A1 | 6/2022 | Child et al. | |
| 2022/0294946 A1 | 9/2022 | D'Annunzio | |
| 2023/0010292 A1 | 1/2023 | Simon | |
| 2023/0046309 A1* | 2/2023 | May | G08G 5/006 |
| 2023/0070108 A1 | 3/2023 | Child | |
| 2023/0073717 A1 | 3/2023 | Child | |
| 2023/0073876 A1 | 3/2023 | Child | |
| 2023/0162310 A1 | 5/2023 | Child et al. | |
| 2023/0177954 A1 | 6/2023 | Neff et al. | |
| 2023/0196780 A1 | 6/2023 | Nieuwkerk et al. | |
| 2023/0237907 A1 | 7/2023 | Valcarcel et al. | |
| 2023/0274647 A1 | 8/2023 | Nieuwkerk et al. | |
| 2024/0021092 A1 | 1/2024 | Child | |
| 2025/0157327 A1 | 5/2025 | Child | |

FOREIGN PATENT DOCUMENTS

| | | | |
|---|---|---|---|
| CA | 2916418 | A1 | 6/2017 |
| CA | 3000127 | A1 | 6/2018 |
| CA | 2924997 | C | 6/2021 |
| CA | 2979406 | C | 2/2024 |
| CN | 102708693 | A | 10/2012 |
| CN | 203050715 | U | 7/2013 |
| DE | 102005035242 | A1 | 2/2007 |
| EP | 0784838 | B1 | 6/2000 |
| EP | 1993279 | A2 | 11/2008 |
| EP | 3726253 | A1 | 10/2020 |
| EP | 3989194 | A1 | 4/2022 |
| FR | 2975210 | A3 | 11/2012 |
| GB | 2328731 | A | 3/1999 |
| IN | 282920 | B | 5/2017 |

(56) References Cited

FOREIGN PATENT DOCUMENTS

| | | | |
|---|---|---|---|
| SG | 140858 | A1 | 4/2008 |
| TW | 201935419 | A | 9/2019 |
| WO | WO2004/027730 | A1 | 4/2004 |
| WO | WO2007/032025 | A2 | 3/2007 |
| WO | WO2008/088880 | A1 | 7/2008 |
| WO | WO2011/023024 | A1 | 3/2011 |
| WO | WO2012/038964 | A2 | 3/2012 |
| WO | WO2014/152923 | A1 | 9/2014 |
| WO | WO2015/193903 | A2 | 12/2015 |
| WO | WO2017/180900 | A1 | 10/2017 |
| WO | WO2018/009567 | A1 | 1/2018 |
| WO | WO2019/043444 | A1 | 3/2019 |
| WO | WO2019/043446 | A1 | 3/2019 |
| WO | WO2019/099149 | A1 | 5/2019 |
| WO | WO2019/162970 | A1 | 8/2019 |
| WO | WO2020/145882 | A1 | 7/2020 |

OTHER PUBLICATIONS

Panganiban, Edward B. et al.; "RFID-Based Vehicle Monitoring System"; 2017 IEEE 9th International Conference on Humanoid, Nanotechnology, Information Technology, Communication and Control, Environmental Management (HNICEM); IEEE, Dec. 1-3, 2017; pp. 1-6; Year 2017.

Howington, Larry C.; Automated License Plate Reading; Development and use of Perceptics multi-purpose License Plate Reader Technology; Sep. 1989.

Waters, Rebecca; Automated License Plate Recognition: An Insider's Look; P&SN Police and Security News 2022; Posted by Publisher—Sep. 15, 2017.

Ceng, M. Smalley et al.; Videqual—A tool for quantitive meansurement of fixed CCTV Surveillance Systems; Presented and Published at the International Carnahan Conference on Security Technology 1996; 0-7803-3537-6-9/06; 1996 IEEE.

Kanayama, Kenji et al.; Development of Vehicle-License Number Recognition System Using Real-Time Image Processing and Its Application to Travel-Time Measurement; CH2944-7/91/0000/0798; 1991 IEEE.

Kwasnicka, Halina and Wawrzyniak, Bartosz; License Plate Localization and Recognition in Camera Pictures; AI-METH 2002—Artificial Intelligence Methods; Gliwice, Poland, Nov. 13-15, 2002.

Appian Technology PLC; Talon—Description and Technical Specification—Automatic Number Plate Recognition System; Copyright 2003.

Hoffman, Alwyn Jakobus and Albertus J. Pretorius: "SmartRoad; A new approach to law enforcement in dense traffic environments"; 2015 IEEE 18th International Conference on Intelligent Transportation Systems. IEEE, 2015; Year 2015.

Yaacoub, et al.; Security analysis of drones systems: Attacks, limitations, and recommendations; Internet of Things 11 (2020) 100218; Elsevier; www.elsevier.com/locate/iot; Retrieved on Apr. 17, 2023 (Apr. 17, 2023) from https://www.ncbi.nlm.nih.gov/pmc/articles/PMC7206421/.

Makarov, A., et al.; Authenticating Vehicles and Drivers in Motion Based on Computer Vision and RFID Tags; 2012 IEEE 10th Jubilee International Symposium on Intelligent Systems and Informatics; IEEE 2012; Year 2012.

Notification and International Search Report and Written Opinion; related Application No. PCT/US21/62619 dated Mar. 1, 2022.

Hu, Weiming, et al.; "A Survey on Visual Surveillance of Object Motion and Behaviors"; IEEE Transactions on Systems, Man, and Cybernetics, Part C: Applications and Reviews, vol. 34, No. 3, Aug. 2004; pp. 334-352; Year 2004.

Valera, M. and Velastin, S.A., "Intelligent distributed surveillance systems: a review", Source: vol. 152, Issue 2, Apr. 2005, p. 192-204, DOI: 10. 1049/ip-vis:20041147, Print ISSN 1350-245X, Online ISSN 1359-7108; 13 pages; 2005.

Hampapur, A.; "smart video surveillance: exploring the concept of multiscale spatiotemporal tracking", Published in: IEEE Signal Processing Magazine (vol. 22, Issue: 2, Mar. 2005), pp. 38-51; 2005.

Girgensohn, Andreas, "DOTS: Support for Effective Video Surveillance", MM '07: Proceedings of the 15th ACM International conference on Multimedia Sep. 2007; pp. 423-432; 2007.

U.S. Appl. No. 12/118,501, filed Oct. 15, 2024, Davis et al.

Foresti, Gian Luca et al. "Visual Sensor Technology for Advanced Surveillance Systems: Historical View, Technological Aspects and Research Activities in Italy", Department of Mathematics and Computer Science University of Udine, via delle Scienze, 206, 33100 Udine, Italy, Sensors ISSN 1424-8220; 19 Pages (2252-2270); Year 2009.

Abwnawar, N. et al.; Towards Location-Aware Access Control and Data Privacy in Inter-Cloud Communications; IEEE Eurocon 2017, Jul. 6-8, 2017, Ohrid, R. Macedonia; pp. 739-744; Retrieved from the Internet by the European Patent Office and downloaded; UTC from IEEE Xplore, https://ieeexplore.ieee.org on Apr. 18, 2025.

Domingo, Jaime Duque et al.; *Integration of Computer Vision and Wireless Networks to Provide Indoor Positioning*; Sensors MDPI (Bazel, Switzerland); Dec. 12, 2019, 19, 5495; doi: 10.3390/s19245495; www.mdpi.com/joumal/sensors; pp. 1-17; 2019.

Zhu, Dali et al.; *Fusion of Wireless Signal and Computer Vision for Identification and Tracking*; 2021 28th International Conference on Telecommunications (ICT); 7 total pages; 2021.

Guo, Yan et al.; *RFIDCam: a RFID-Aided Visual Tracking System*; The 2018 International Conference on Control Automation & Information Sciences (ICCAIS 2018) Oct. 24-27, 2018, Hangzhou, China; pp. 297-302; 2018.

Grzechca, Damian et al.; *Indoor location and idetification of objects with video surveillance system and WiFi module*;2014 International Conference on Mathematics and Computers in Sciences and in Industry; DOI 10.1109/MSCI.2014.52; pp. 171-174; 2014.

Liu, Hansi et al.; *Vi-Fi: Associating Moving Subjects across Vision and Wireless Sensors; 2022 21st ACM/IEEE International Conference on Information Processing in Sensor Networks* (*IPSN*); IPSN 22, May 4-6, Milan, Italy; DOI 10.1109/IPSN54338.2022.00024; pp. 208-219; 2022.

* cited by examiner

100

104

SYSTEMS AND METHODS FOR ELECTRONIC SIGNATURE TRACKING

CROSS-REFERENCE TO RELATED APPLICATIONS

The present application is a continuation of co-pending U.S. patent application Ser. No. 18/099,377, filed Jan. 20, 2023, which is a continuation of U.S. patent application Ser. No. 17/546,334, filed Dec. 9, 2021, which claims benefit of U.S. Provisional Patent Application No. 63/125,557, filed Dec. 15, 2020.

INCORPORATED BY REFERENCE

The disclosures of U.S. patent application Ser. No. 18/099,377, filed Jan. 20, 2023, U.S. patent application Ser. No. 17/546,334, filed Dec. 9, 2021, and Provisional Patent Application No. 63/125,557, filed Dec. 15, 2020, are incorporated by reference herein for all purposes as if set forth in their entireties.

TECHNICAL FIELD

In one aspect, the present disclosure is directed to surveillance systems and methods, and more specifically, to surveillance systems and methods that facilitate collection and correlation of electronic signatures and/or visual identifiers. Other aspects also are described.

BACKGROUND

Automated License Plate Readers ("ALPR") typically are used for identifying vehicles in selected locations, e.g., for detecting traffic violations, collecting tolls, etc. . . . . However, existing ALPR systems are quite expensive and generally are used for identification of vehicles on roads, in parking lots, other vehicle throughways, etc. Such existing systems further generally are not used for identification and/or tracking of persons separate from their vehicles. In addition, these systems may have difficulty determining who is driving or is a passenger in any given vehicle.

It can be seen that a need exists for surveillance systems and methods that can be used in conjunction with or in place of existing ALPR systems to provide for more precise, reliable, and/or consistent identification or tracking of vehicles, as well as persons associated with, and not associated with, vehicles.

The present disclosure is directed to the foregoing and other related, and unrelated, problems in the relevant art.

SUMMARY

Briefly described, the present disclosure includes surveillance systems and methods for collecting and correlating electronic signatures and/or visual identifiers to build intelligence databases that can facilitate tracking and associating indicators of common location and movement of targets throughout selected geographic areas or locations. Targets generally refer to persons, vehicles, e.g., an automobile, or both, such a one or more persons within a vehicle. However, targets can include other objects, such as one or more electronic devices, e.g. cell phones or other communication devices, RFID and other sensors or transmitting devices internal to vehicles or as after-market additions, and/or various other, similar devices, without departing from the scope of the present disclosure.

According to some aspects, a surveillance system is provided, which is capable of utilizing a variety of electronic signal sensors as standalone collections systems or in conjunction with ALPR systems (including new and existing ALPR systems in the field) to capture and catalogue electronic signals, such as radio frequency (RF), Bluetooth® and other signals from various types of electronic devices, as events that occur in proximity to these sensors substantially in real time. The system generally will capture the identifying information in such collected signals/transmissions as electronic signatures and catalogue them in a database with certain identifying characteristics, such as, but not limited to, location data such as geographical coordinates, time stamps, signal or device source manufacturer data, source type and unique ID, etc., allowing these captured events/electronic signatures to become unique, identifiable and searchable. The system will include programming, including one or more developed correlation and search engines, configured to evaluate and combine singular detected events with other catalogued events to develop correlated information related to the intersection of multiple defined electronic signatures (generated or developed from captured events) that occurred at a specific time and geographical location or area. In embodiments, the electronic signal sensors will be used in conjunction with ALPR systems in areas, allowing the surveillance system to develop a subset of electronic signals associated with a license plate read at a moment in time and identified or recorded location. Once the surveillance system has collected records correlating electronic signatures associated with a license plate, the surveillance system can be enabled to thereafter detect a likely presence of a vehicle and its associated license plate at an identified location, with or without the use of a camera. Furthermore, if placed in locations not associated with vehicular traffic, the surveillance system will be able to identify, and catalogue known electronic signatures away from the vehicles with which they have typically been associated.

According to aspects of the present disclosure, a surveillance system can include a plurality of collection systems or assemblies each located at selected geographic areas or locations. The collection systems generally are configured to capture or facilitate collection of information related to visual identifiers and/or electronic signatures associated with targets in or moving about the selected areas/locations.

In some embodiments, the collection systems can include at least one sensor configured to collect or otherwise capture information related to visual identifiers and/or electronic signatures of targets. The visual identifiers can include visual vehicle identifiers, such as license plate information or other visual or imaged information associated with vehicles (e.g., stickers, patterns, position(s) of component parts, after-market added parts, damage, and/or various other markings, etc.) that can be used to distinguish or otherwise identify, detect or discern a target vehicle, etc. The electronic signatures can include an electronic signal or combination(s) of electronic signals emanating from transmitting electronic devices and which are associated with and/or can uniquely identify the targets in or moving about the selected areas/locations.

In addition, in some aspects, the surveillance system can include an intelligence system that is in communication with the plurality of collection systems. The intelligence system is configured to receive the information collected or captured by the collection systems (e.g., data points or packets of time and date stamped information in real time when targets get within proximity of the collection point systems), and to identify and/or track the targets based on this received information.

In embodiments, the intelligence system can include one or more classification and search engines and an intelligence database in communication therewith. The one or more classification and search engines can be configured to identify or extract the electronic signatures associated with the targets using the information collected by the collection systems and catalogue them in the intelligence database with certain identifying characteristics (e.g., geographical coordinates, time stamps, source manufacturer, source type and unique ID, etc.) allowing these identified electronic signatures to become unique, identifiable, and searchable.

The surveillance system thus is configurable to track, map, catalogue, etc., movements of the targets in real time as electronic signals emanating therefrom occur in proximity to the collection systems. The tracking information generated can be used to help confirm and/or authenticate a potential target identification, and further can be configured to generate alerts or notifications when certain targets are in proximity to the collection systems.

The one or more classification and search engines can infer relationships between electronic devices and targets based on consistency of correlation to identify/extract electronic signatures associated with targets.

For example, the one or more classification and search engines can use frequency and consistency of electronic signals to determine the relative certainty of association of the transmitted electronic devices and targets to develop electronic signatures of the targets. That is, if the relative certainty or probability that a certain electronic signal or combination of electronic signals are associated with a target meets a prescribed threshold, the one or more classification and search engines can identify an electronic signal or combinations of electronic signals as a specific electronic signature associated with that target.

The one or more classification and search engines can be configured to filter or otherwise alter to the received electronic signatures, e.g., to reduce signal noise and facilitate identification or extraction of unique, identifying electronic signatures.

In embodiments, the one or more classification and search engines can be configured to locate receipt of a visual identifier and correlated electronic signature to track the target.

In addition, or in the alternative, the one or more classification and search engines will be configured to associate identifying electronic signatures with visual identifiers, such as a visual vehicle identifier, to allow independent tracking and location identification of targets based on the associated identifying electronic signatures. That is, once the system has records correlating electronic signatures associated with a specific visual vehicle identifier, e.g., a specific license plate number, the intelligence system will be able to detect the likely presence of a vehicle and its associated license plate without visual information, e.g., without the use of a camera.

Furthermore, the collection systems can be placed in locations or areas not associated with vehicular traffic, such that the intelligence system will be able to identify, and catalogue known electronic signatures away from the vehicles they have typically been associated with, e.g., for tracking, mapping, etc. of persons or electronic devices apart from vehicles.

In embodiments, the at least one sensor of each collection system can include a plurality of sensor assemblies. The sensor assemblies can include one or more cameras or camera systems configured to capture or facilitate collection of information related to vehicle identifiers, such as visual information related to a license plate of a vehicle or other visual vehicle identifiers.

In addition, the sensor assemblies can include one or more antennas or other signal receivers configured to capture information related to the electronic signatures. The one or more antennas can include a plurality of antennas, such as a Bluetooth® antenna, a Wifi antenna, a RFID antenna, or other RF antennas or combinations thereof, configured to capture information related to electronic signals associated with the targets.

In some embodiments, the collection systems can be used in conjunction with Automated License Plate Readers ("ALPR") in certain areas, allowing the intelligence system to develop a subset of electronic signals, i.e., an electronic signature, associated with a license plate read at a moment in time and location. Electronic data points from less expensive collectors can then be used to provide more precise tracking than ALPR alone.

In some embodiments, the surveillance system can be configured to capture sample electronic signature information from a target, associate that information with the target's identification, and then search for or alert on receipts of similar electronic signature information at one of the collection point systems.

In additional embodiments, the surveillance system can be configured to allow for search inquiries or scans of suspect's electronic signatures to search known location data points in the database history, placing the suspect at those locations and times.

In still other embodiments, the surveillance system can be configured to allow for labeling of specific electronic signatures with a target and then alert or search for history of those specific electronic signatures in the database, placing the target at various locations.

In further embodiments, the surveillance system further can indicate or determine changes in association or travel of suspects or other individuals of interest based on variations in electronic signatures associated with a target or targets.

Various objects, features, and advantages of the present disclosure will become apparent to those skilled in the art upon a review of the following detail description, when taken in conjunction with the accompanying drawings.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1A:
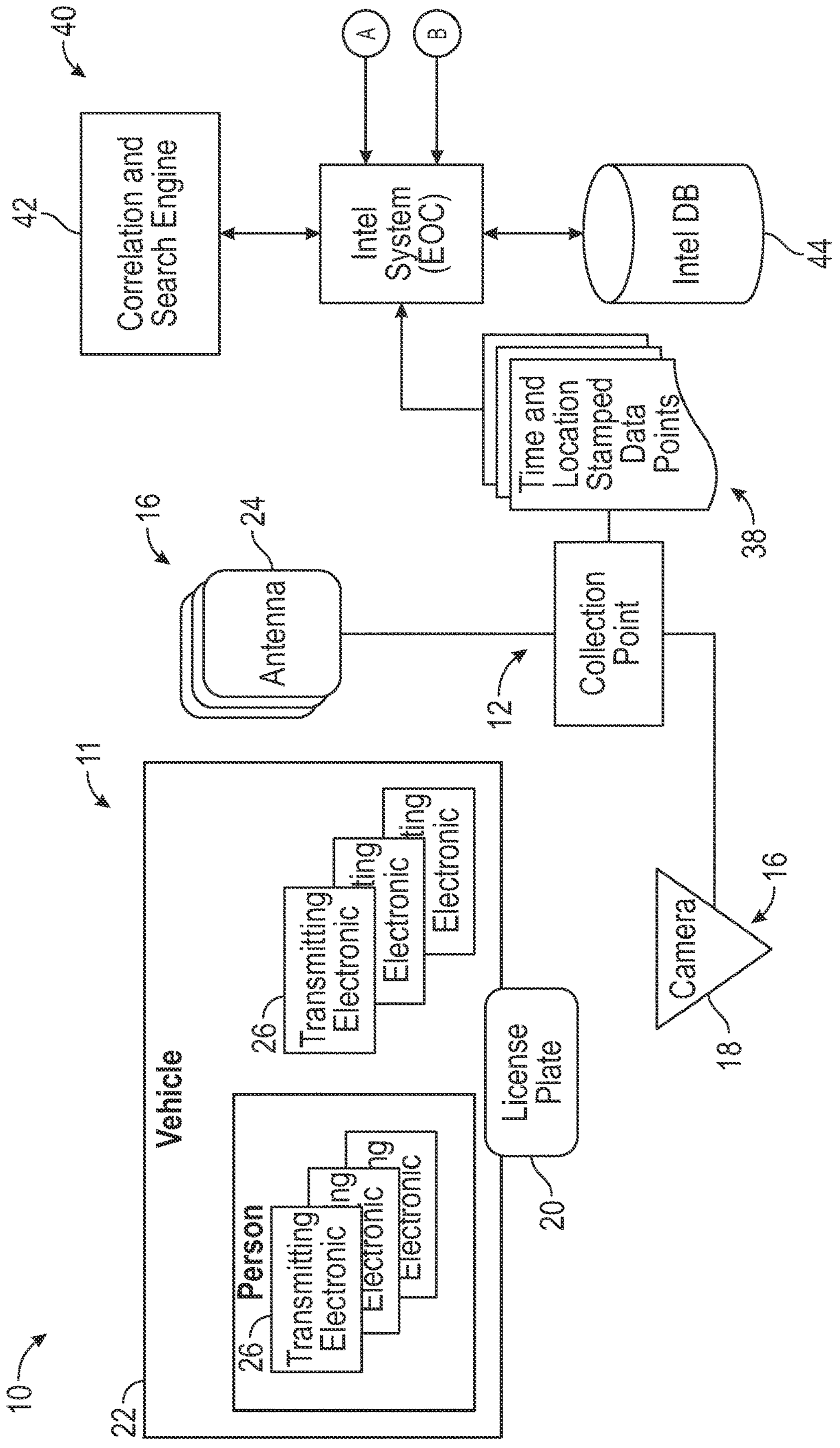
FIGS. 1A-1B are schematic diagrams of a surveillance system according to the present disclosure.
Figure 1B:
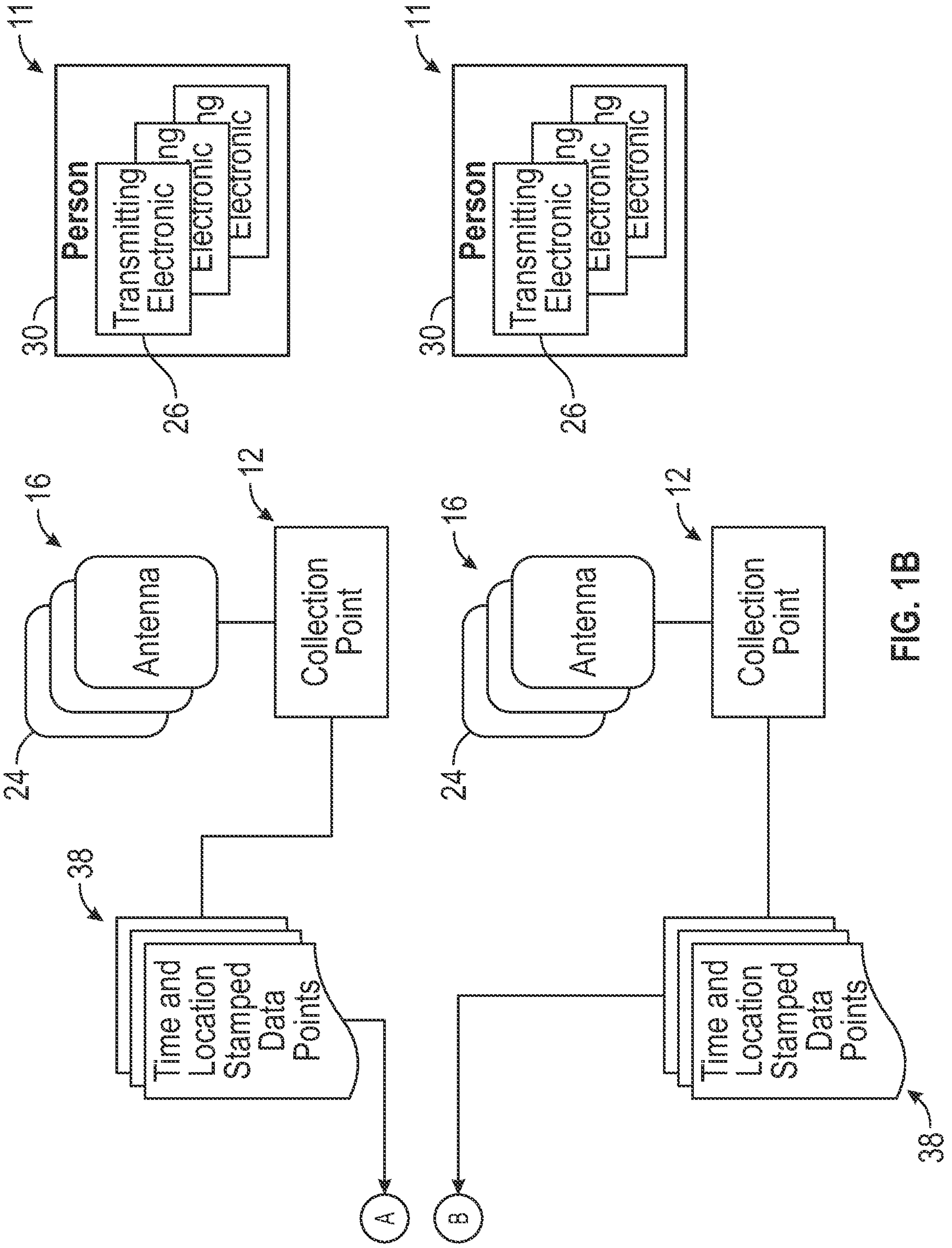

FIGS. 1A-1B provide a schematic diagram of an example embodiment of a surveillance system 10 for collecting and correlating electronic signatures and visual identifier information to build intelligence databases that facilitate tracking and associating indications of common location and movement of targets 11 throughout selected geographic areas or locations.

As indicated in FIGS. 1A-1B, the surveillance system 10 includes a plurality of collection systems 12 or assemblies that are located at selected geographic areas or locations. The collection systems 12 generally will be configured to capture or facilitate collection of information related to visual identifiers and/or electronic signatures associated with targets 11. The targets 11 generally will include persons 30, vehicles 22, or a combination of both in and/or moving about the selected areas or locations. Targets 11 also can include transmitted electronic devices or other objections, without departing from the scope of the present disclosure. The collection systems 12 can be positioned at various locations or collection points about a specific geographic area, e.g., a municipality, county, other public or private areas, or combinations thereof (see FIGS. 3A-3B).

FIGS. 1A-1B show an embodiment wherein each collection system 12 includes a sensor or sensor assembly 16 configured to collect or otherwise capture the information related to visual identifiers and/or electronic signatures of targets 11. The sensor or sensor assembly 16 accordingly can include one or more cameras or camera systems 18 configured to capture or facilitate collection of information related to vehicle identifiers, such as visual or imaged information related to a license plate 20 of a vehicle 22 and/or other visual vehicle identifiers that can be used to discern, detect and/or otherwise identify or confirm the identity of a target vehicle. For example, in some aspects, such vehicle markings can include, but are not limited to, signage, stickers, bumper stickers, non-license plate tags, patterns, position or configuration of component parts, damage to the vehicle, such as scratches, dents, repair marks, etc. and the location thereof on the vehicle, small markings or symbols or other indicia on vehicle components, as well as various other identifiable visual markings, or combinations thereof). In some embodiments, the camera system 18 also can include an Automated License Plate Reader ("ALPR") integrated or otherwise associated with a collection system 12, or the surveillance system 10 can include ALRPs in addition to, or in place of, one or more collection systems 12.

In addition, or in the alternative, the at least one sensor or sensor assembly 16 also can include an antenna, antenna array, or plurality of antennas 24 configured to capture or otherwise receive electronic signals from transmitting electronic devices 26 associated with the targets 11 for identification/extraction of electronic signatures. The at least one sensor or sensor assembly 16 can include additional sensors, such as IR sensors or other light sensors, without departing from the present disclosure.

The transmitting electronic devices 26 include, but are not limited to, transmitting electronic devices associated with a vehicle, such as vehicle components including, but not limited to, tire pressure sensors or other manufacturer installed or after-market vehicle sensors, vehicle stereo or entertainments systems, vehicle navigation systems, vehicle infotainment systems, self-driving or driver assist vehicle guidance systems, vehicle Wifi hotspots, other components of internal or external vehicle systems, etc.; and additionally can include transmitting electronic devices associated with persons 30 or other types of targets, including, but not limited to, cellular phones and/or other communication devices, tablets, laptops, smart watches, fitness trackers, wireless headphones, RFID tags (e.g., key cards, library books, assets tags, pallet transmitters, pet collars), Wifi hot spots, and other personal electronic devices. Each sensor or sensor assembly 16 is configured to capture or collect signals transmitted by or otherwise emanating from the transmitting electronic devices 26 when the targets 11 get within proximity of the collection systems 12. The collection systems 12 can be configured to receive signals at a prescribed or selected proximity in relation thereto. For example, in some embodiments, the collection systems could be configured to look for and receive signals transmitted within about 200 feet of the collection systems 12; while in other embodiments, such as to reduce or limit extraneous noise or to help filter such noise, shorter ranges of signals also can be used, i.e. in some locations, the collections systems can be configured to receive signals transmitted within about 100 feet of the collection systems 12, and in still other embodiments or locations, signals transmitted within about 50 feet of the collection systems 12. Other, varying ranges also can be used.

In addition, the surveillance system 10 includes an intelligence system 40 that is in communication with the plurality of collection systems 12. The intelligence system 40 is configured to receive information collected or captured by the collection systems 12 and to identify and/or track targets 11 based on this received information. The intelligence system 40 can be in wireless communication with the collection systems 12, e.g., through a public or private network using Wifi, cellular, etc. In addition, or in the alternative, the intelligence system 40 and one or more of the collection systems 12 can be connected through one or more wired connections. In this regard, when targets 11 come within proximity of the collection systems 12, the collection systems 12 will collect visual information and/or electronic signal information associated with the targets 11 and transmit data points or packets 38 of information, e.g., time and location stamped information, related to collected visual and/or electronic signal information to the intelligence system 40. The collection systems 12 can be configured to transmit data points or packets 38 substantially simultaneously or generally in real time when targets 11 come within proximity to the collection systems 12. For example, the collection systems 12 can send a data point including information corresponding to each electronic signal or visual identifier as it is captured or can send a data packet including information corresponding to multiple electronic signals or visual identifiers received. In addition, or in the alternative, the collection systems 12 can transmit the data points or packets 38 at specific time intervals, such as every few seconds, minutes, hours, etc. or at other times or intervals after the electronic signals or visual identifiers are captured, without departing from the scope of the present disclosure.

FIGS. 1A-1B further show that the intelligence system 40 will include programming, including a correlation and search engine 42 and an intelligence database 44. The correlation and search engine 42 is configured to identify or extract electronic signatures associated with the targets 11 using collected visual and/or electronic signal information at the collection systems 12. For example, the correlation and search engine 42 is configured to ingest or process the data points/data packets 38 to associate or correlate the visual identifiers with the received electronic device signals to facilitate the identification or extraction of electronic signatures identifying the targets 11. The electronic signatures can include information related to the collected electronic signals of the transmitting electronic devices 26 or combinations of collected electronic signals of the transmitting electronic devices 26 that uniquely identify the targets 11. For example, and without limitation, a combination of one or more signals from a plurality of transmitting electronic devices (e.g., a watch, cell phone/communication device, headphones, etc.) can include an electronic signature that uniquely identifies a person; a combination of one or more signals from a plurality of transmitting vehicle components (e.g., a vehicle sensor, infotainment system, etc.) can include an electronic signature that uniquely identifies a vehicle, or one or more signals from a transmitting electronic device can include an electronic signature that uniquely identifies that electronic device.

The correlation and search engine 42 further can be configured to filter or otherwise alter the received electronic signatures (or information related thereto) to reduce or diminish signal noise and facilitate identification or extraction of unique, identifying electronic signatures. For example, the correlation and search engine 42 can apply filtering (e.g., linear or non-linear filters, dynamic noise reduction, etc.) to collected electronic signals to diminish, reduce, or substantially eliminate stationary and variable noise and other values that cannot be usefully correlated with targets 11, allowing unique electronic signal values to be extracted or identified.

In addition, the correlation and search engine 42 is configured to catalogue the electronic signatures in the intelligence database 44 with specific identifying characteristics allowing these identified electronic signatures to become unique, identifiable, and searchable. The identifying characteristics can include, but are not limited to, geographical coordinates, time stamps, source manufacturer, source type and unique ID, etc. The correlation and search engine 42 also can be configured to build catalogs or groupings of independent data points/data packets 38 in the intelligence database 44 that allow correlation analysis to show what otherwise anonymous or non-unique electronic signals consistently appear with the targets 11. The surveillance system 10 thus can identify, track, map, catalogue, etc., the presence and/or movements of the targets 11 in real time as electronic signals emanating therefrom occur in proximity to the collection systems 12. The surveillance system 10 further can generate alerts or notifications when certain targets 11 are in proximity to the collection systems 12. Still further, the surveillance system 10 further allows for the searches or queries of the intelligence database 44, e.g., for investigating locations or movements of suspects or other persons of interest.

In embodiments, the correlation and search engine 42 can use algorithms, models, etc., to infer relationships between transmitting electronic devices 26 and targets 11 based on consistency or likelihood of correlation of the visual identifiers and electronic signals of the transmitting electronic devices. For example, the correlation and search engine 42 can be configured to evaluate and combine singular collection events at the collection systems 12 with other catalogued events in the intelligence database 44 to develop correlated information related to the intersection of multiple collected/captured electronic signals that occurred at a specific time and geographical area or location. And, the correlation and search engine 42 can use the frequency and/or consistency of electronic signals received at collection systems 12 to determine the relative certainty of association of the transmitting electronic devices 26 and targets 11 to develop electronic signatures for the targets 11.

The correlation and search engine 42 can be programmed to determine a likelihood or probability that a specific electronic signal or combination or set of electronic signals is associated with a target 11, and if the determined likelihood or probability meets a prescribed/selected likelihood or probability threshold, the engine 42 will identify and/or extract an electronic signal or combinations of electronic signals as an electronic signature or electronic signatures to be associated with that target 11. In one embodiment, the likelihood or probability threshold can be about 70% or more (e.g., above 75%, above 80%, above 85%, above 90%, above 95%, above 98%, etc.) that a signal or combination/set of signals is associated with a particular target 11.

In some embodiments, the correlation and search engine 42 can be configured to determine or identify a location at which a visual identifier and correlated electronic signature are matched to enable tracking and/or verification of targets 11 at such a location. In addition, or in the alternative, the correlation and search engine 42 can be configured to associate identifying electronic signatures with visual identifiers, such as a visual vehicle identifier, to allow independent tracking and location identification of targets 11 based on the associated identifying electronic signatures. For example, once the correlation and search engine 42 has records correlating electronic signatures associated with a specific visual vehicle identifier, e.g., a specific license plate number, the correlation and search engine 42 will be able to detect the likely presence of a vehicle 22 and its associated license plate 20 without visual information, e.g., without the use of a camera. Furthermore, the collection systems 12 can be placed in locations or areas not associated with vehicular traffic, such that the intelligence system will be able to identify, and catalogue known electronic signatures away from the vehicles 20 they have typically been associated with.

In this regard, in embodiments, the collection systems 12 can be used in conjunction with existing ALPRs in certain areas or locations, allowing the intelligence system 10 to develop a subset of electronic signatures associated with a license plate read at a moment in time and location. For example, one or more collection systems 12 can be positioned near or in close proximity to an existing ALPR to allow for correlation or association of received electronic signals with license plate reads at or near an identified location. In addition, or in the alternative, an existing ALPR can be modified or retrofitted to include components of the collection point systems to enable collection of electronic signals with license plate reads. Further, in some embodiments, collection systems 12 with or near cameras 18 or ALPRs can be used in connection with collection systems 12 without cameras or ALPRs, as generally indicated in FIGS. 1A-1B. As a result, electronic data points 38 from less expensive collection systems 12 can be used to provide more precise tracking than ALPR alone. That is, the lower cost collection systems 12 can increase collection density of potential identifying data beyond the collection of ALPR or camera records, enabling data from both collection system

12 types to be combined (e.g. the target identifying ALPR data collected can be supplemented with additional target data such as an electronic signature or other identifying information) to provide more detailed intelligence and increased accuracy of verification or authentication of possible targets, including providing monitoring personnel (e.g. law enforcement, security or other personnel) with an increased level of confidence of locations of potential criminals, stolen or other vehicles of interest.

Additionally, or alternatively, collection systems 12 without cameras (or with cameras) can be positioned in areas or locations that cannot be accessed by a vehicle, such as on trains, near railways, around public buildings, etc., to enable collection of electronic signals from persons away from their vehicle, e.g., for cataloguing, tracking, mapping, etc. positions or movements thereof.

The intelligence system 40 generally includes one or more processors, controller's, CPUs, etc., and one or more memories, such as RAM, ROM, etc., in communication with the one or more processors. The collection and search engine 42 can include computer programming instructions stored in the one or more memories that can be accessed and executed by the one or more processors to facilitate execution of the processes thereof, e.g., correlation of information, identification and tracking of the targets 11, searching of the intelligence database 44, etc.

Figure 2:
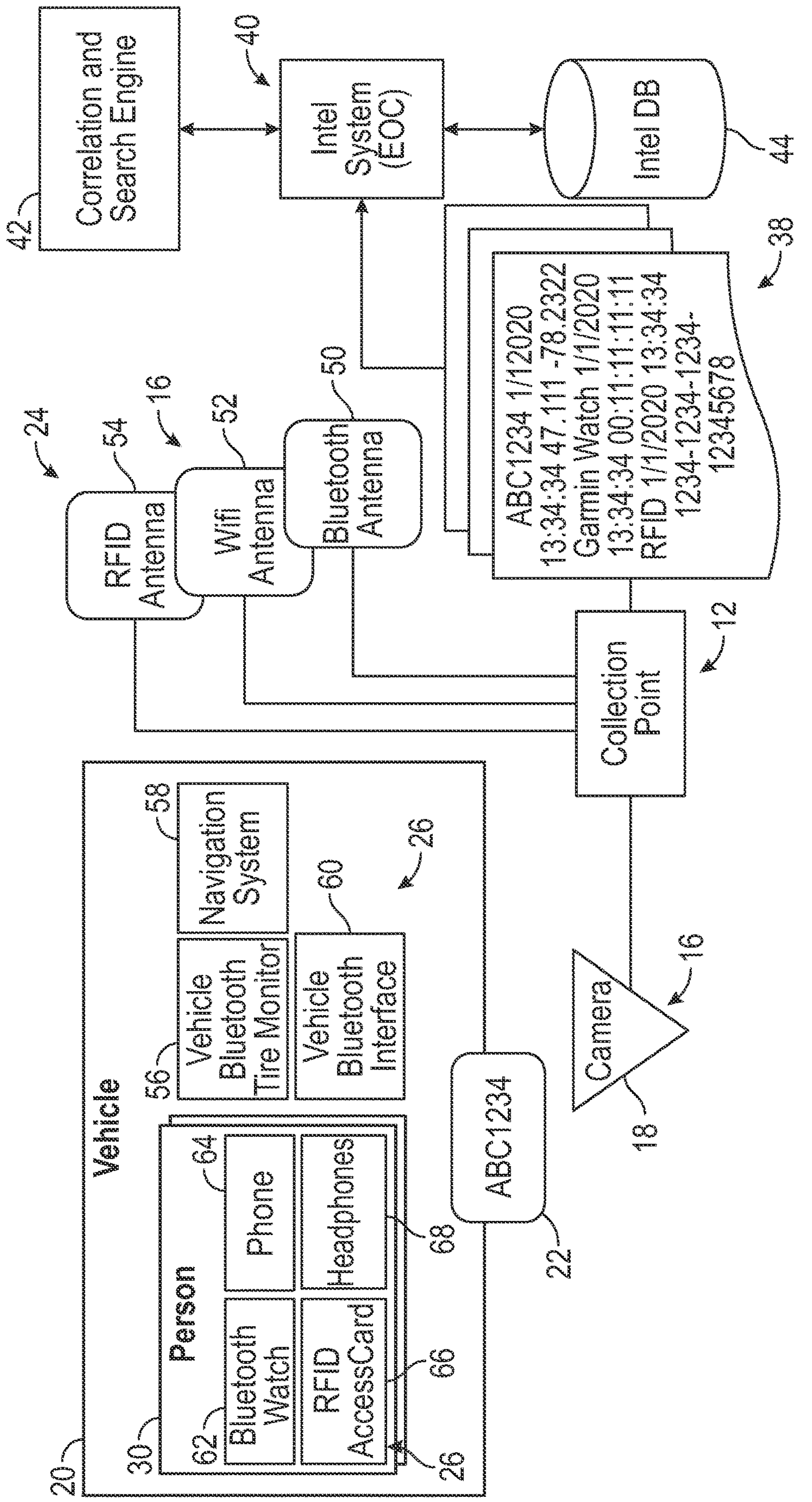
FIG. 2 is a schematic diagram of an example collection point system of the surveillance system of FIGS. 1A-1B.

FIG. 2 shows an example collection system 12. As indicated in FIG. 2, the sensor or sensor assembly 16 of the collection system 12 is a plurality of sensor assemblies including one or more cameras or camera systems 18 and an antenna assembly 24. The one or more cameras or camera systems 18 generally are configured to capture or facilitate collection of information related to license plates 20 of vehicles 22, such as image, video, or other visual information from which a license plate number or other license plate information (e.g., state, registration information, etc.) can be extracted or otherwise identified, e.g., using optical character recognition ("OCR") or other character or feature recognition process. In some embodiments, a collection point system 12 will include an Automated License Plate Reader ("ALPR") configured to capture license plate information.

Additionally, as indicated in FIG. 2, the antenna assembly 24 is configured to capture or otherwise receive a plurality of different electronic signal types, such as Bluetooth®, Wifi, RFID, or other radio frequency ("RF") signals. Specifically, the antenna assembly 24 has a plurality of antennas including a Bluetooth® antenna 50, a Wifi antenna 52, a RFID antenna 54. However, the antenna assembly 24 can include other RF antennas or other antennas configured to capture or receive other signal types or combinations thereof, without departing from the scope of the present disclosure. Still further, in other embodiments, infrared (IR), bar-code, and/or other types of scanning or signaling devices also can be used.

FIG. 2 also shows a vehicle 22 with a plurality of transmitting electronic devices 26 associated therewith, including a vehicle Bluetooth® tire pressure monitor 56, a navigation system 58, and a vehicle Bluetooth® interface 60 (e.g., as part of a vehicle infotainment system). A person 30 in the vehicle 20 is carrying or otherwise has a plurality of transmitting electronic devices 26, including a Bluetooth® smart watch 62, a smart phone 64, an RFID access card 66, and wireless headphones 68. Accordingly, when the vehicle 20 comes within the prescribed proximity to the collection point system 12, the camera 18 will capture visual information associated with the vehicle 20, e.g., the license plate number "ABC1234". The plurality of antenna's 24 further can capture or otherwise receive electronic signals emanating from the transmitting electronic devices 26 associated with the vehicle 20 (i.e., the vehicle Bluetooth® tire monitor 56, a navigation system 58, and a vehicle Bluetooth® interface 60) and the person 30's associated transmitting electronic devices 26 (i.e., a Bluetooth® watch 62, a smart phone 64, an RFID access card 66, and wireless headphones 68).

The collection system 12 then will transmit a plurality of data points 38 to the intelligence system 40 each including information related to the captured electronic signals and the time, date, and location at which they were collected. For example, as FIG. 2 indicates, the data points 38 can include the captured visual information, e.g. the license plate number, with the associated time, date, and location information of collection, the captured electronic signal information, including but not limited to, device manufacturer, device type, signal type, etc., with the associated time, date, and location information of collection, etc. The location information can include geographic information, such as GPS or other coordinates, and additionally or alternatively, can include information identifying the collection point system 12 that collected the visual and/or electronic signal information.

The correlation and search engine 42 can process the information from the received data points or data packages to correlate the received signal information with the visual information to develop electronic signatures uniquely identifying the vehicle 20 or the person 30 in the based on the received electronic signals or combinations thereof, and also can populate the intelligence database 44 with the signature information identifying the vehicle 20 or person 30. Operators then can search or query the intelligence database 44, e.g., using a user interface 100 as shown in FIGS. 3A-3G, for identification, mapping, tracking, etc., of the vehicle 20 and person 30.

In some embodiments, the surveillance system 10 can be configured to capture an electronic signature and associated information from a target 11, and can associate such electronic signature and associated information with the target's identification, e.g., license plate number or other visual identifier, with the correlation and search engine 42, and then allow searches for or provide alerts or notifications on receipts of similar electronic signature information at one or more of the collection systems 12.

Figure 3A:
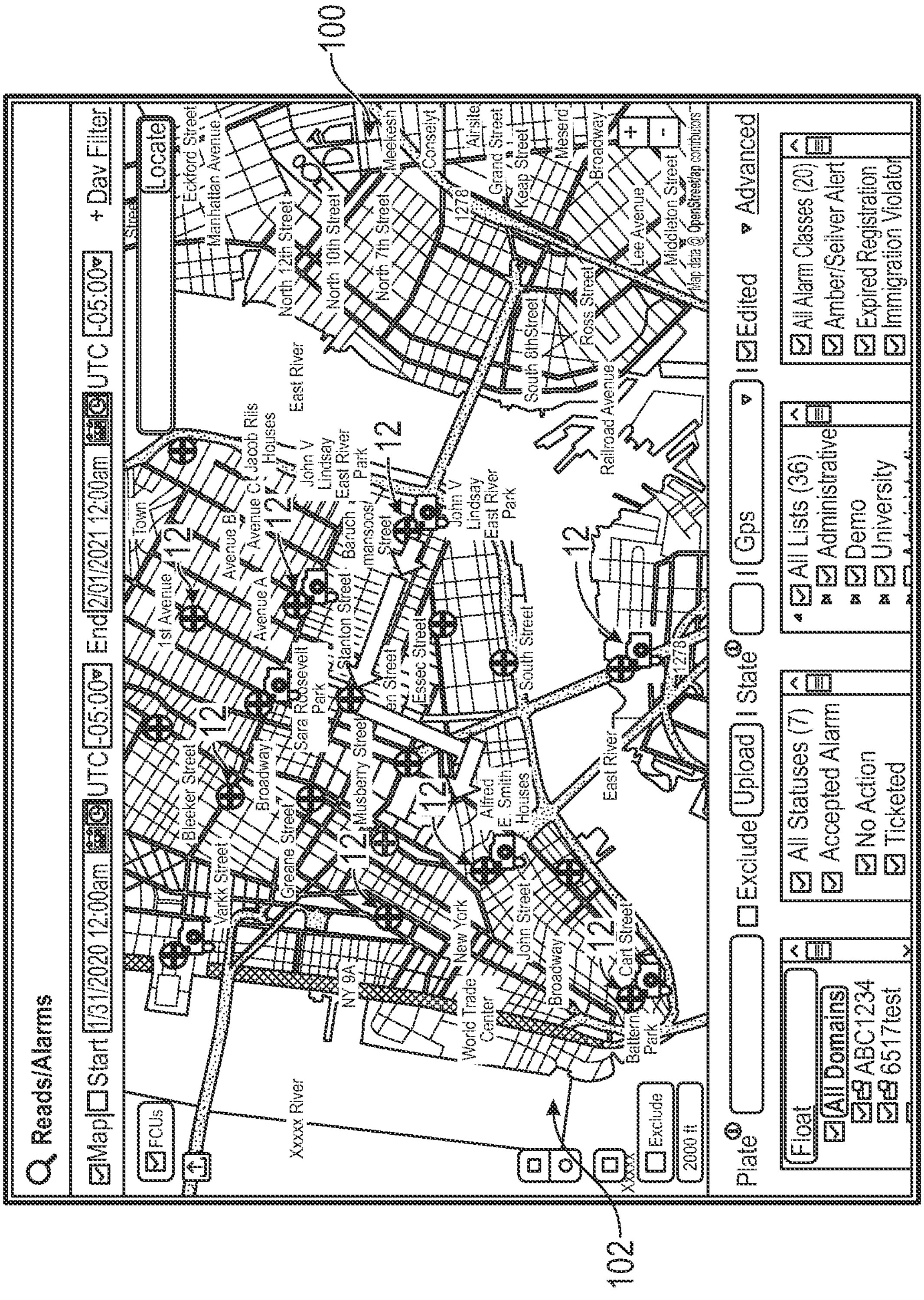
FIGS. 3A-3G show exemplary screen shots of an interface of a surveillance system according to FIGS. 1A-1B.
Figure 3B:
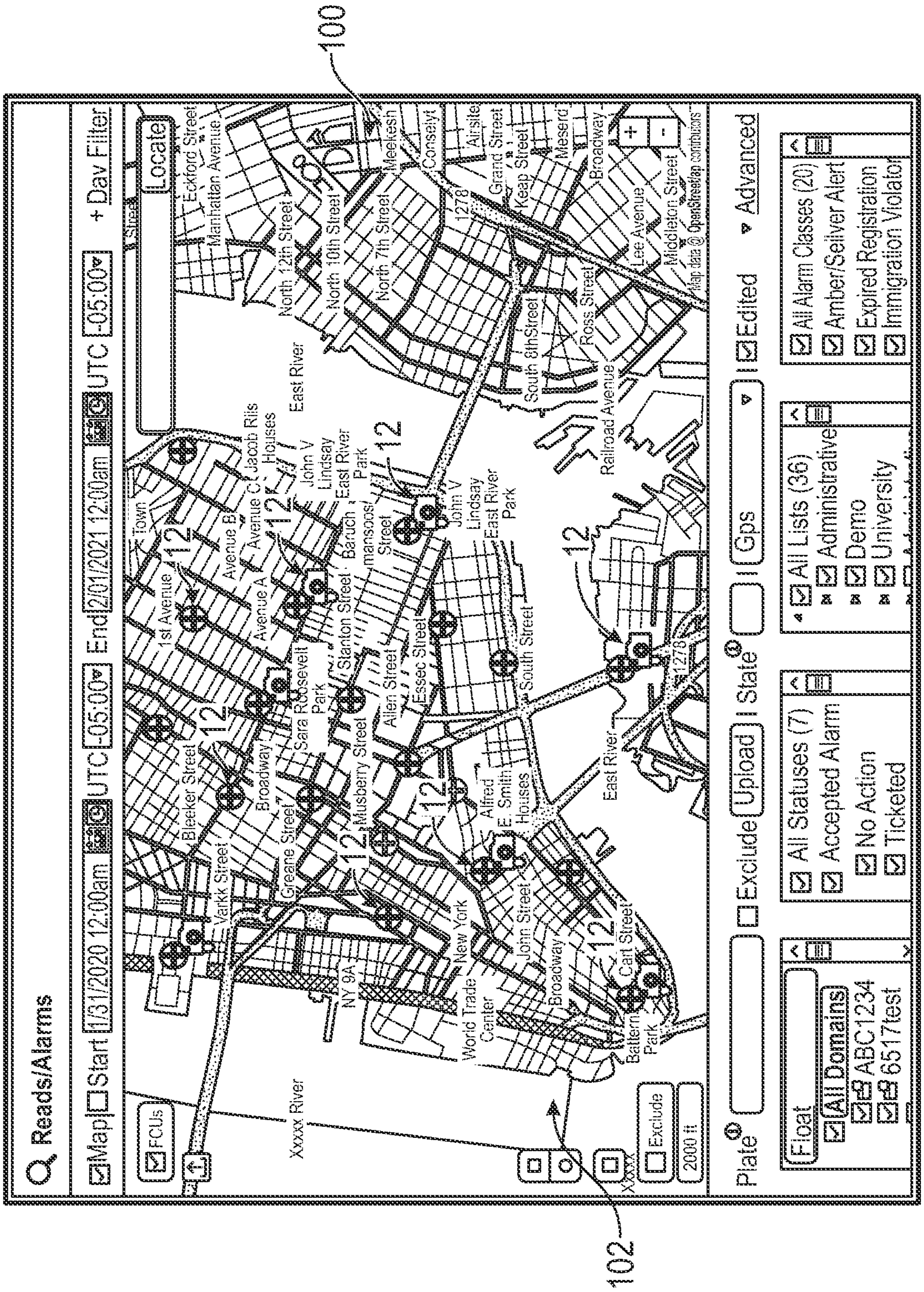

For example, the surveillance system 10 can be configured to allow for search inquiries or scans of one or more specific electronic signatures associated with a target 11, which can include a suspect or person of interest, and to provide search results including known location data points in the intelligence database 44, placing the suspect at those locations and times. The search results can include maps or other images 102 showing the collection systems 12 that captured electronic signals associated with the one or more electronic signatures searched, e.g., indicating the selected target's presence or movements about a prescribed location or area (FIGS. 3A-3B and 3G).

Figure 3C:
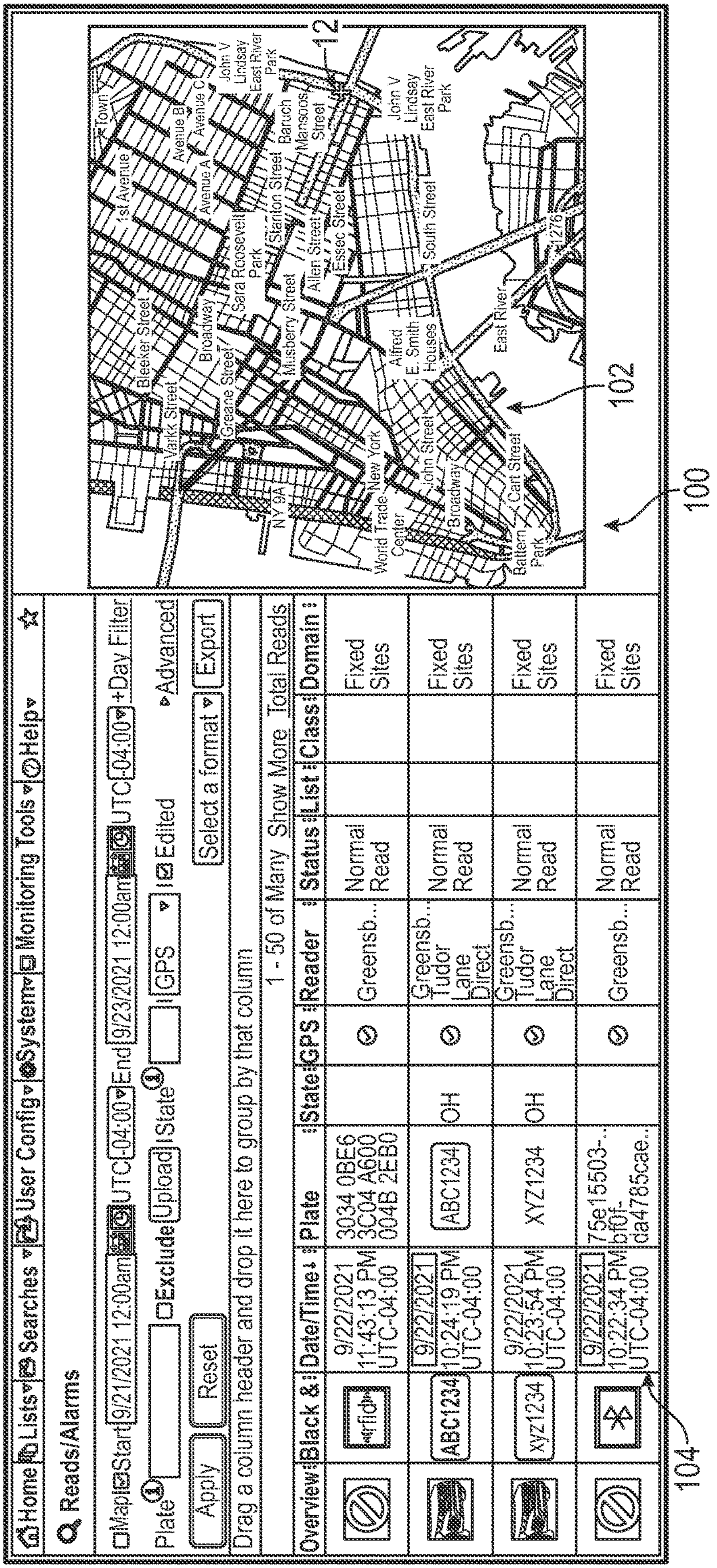
Figure 3D:
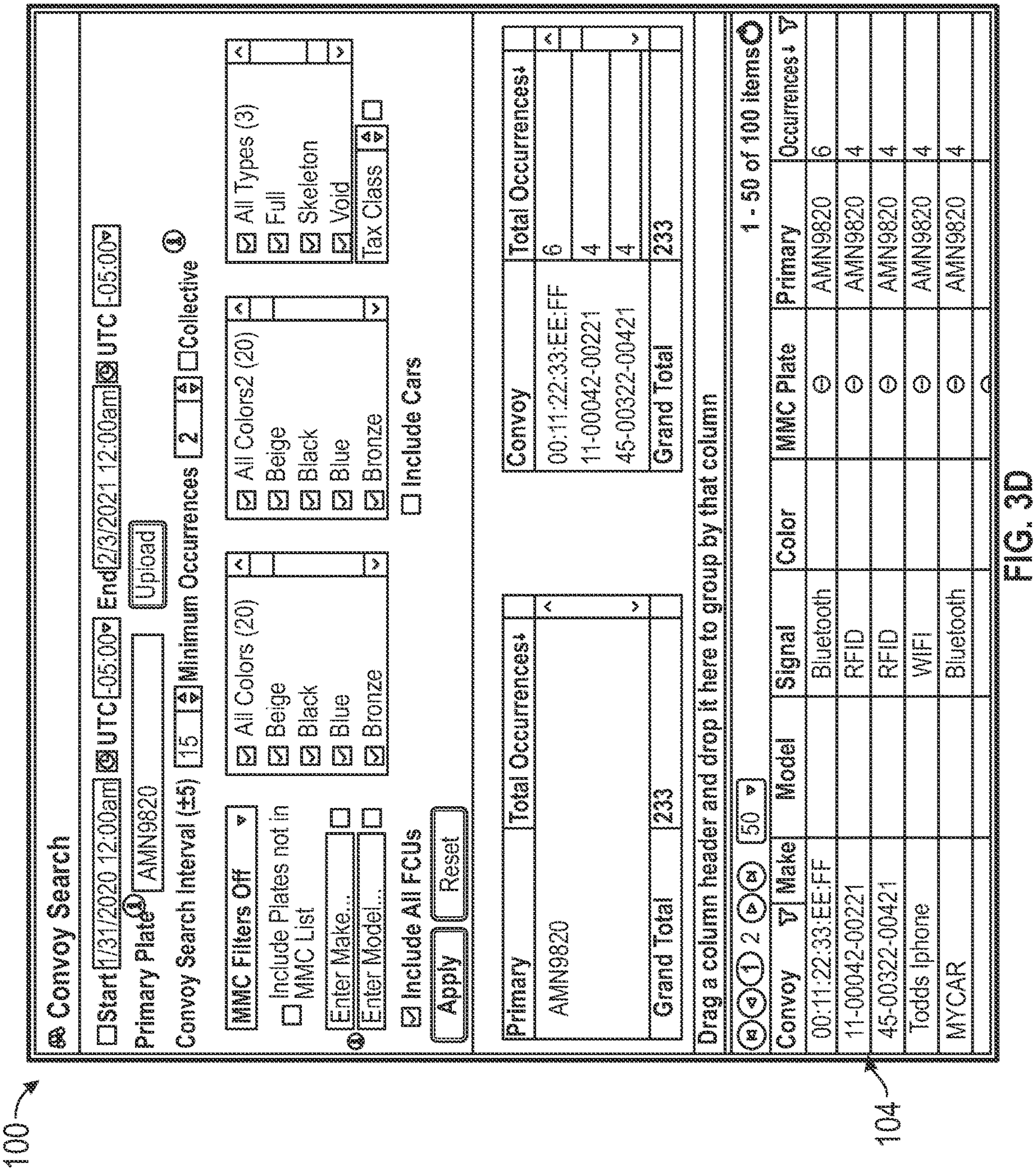
Figure 3E:
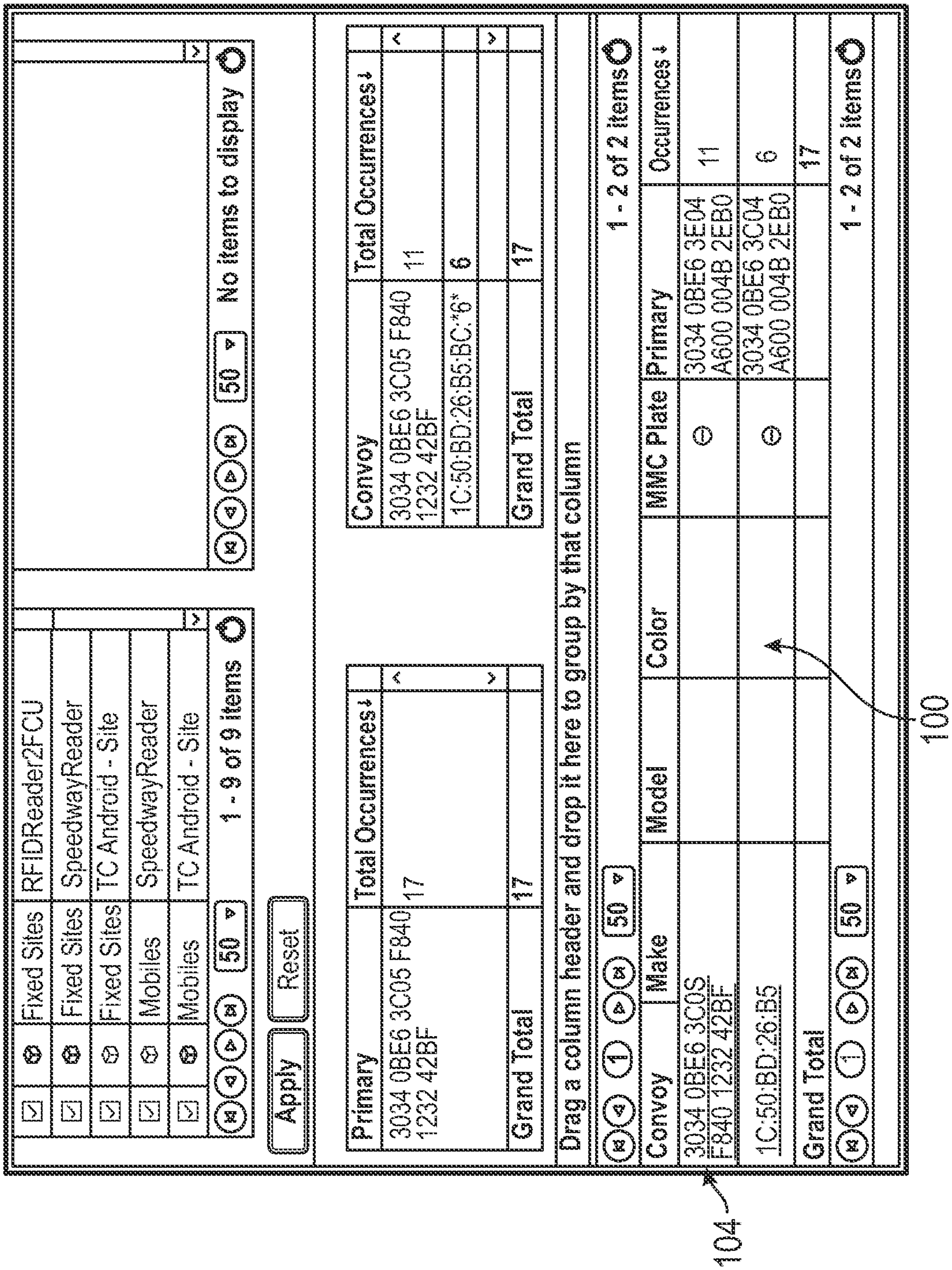
Figure 3F:
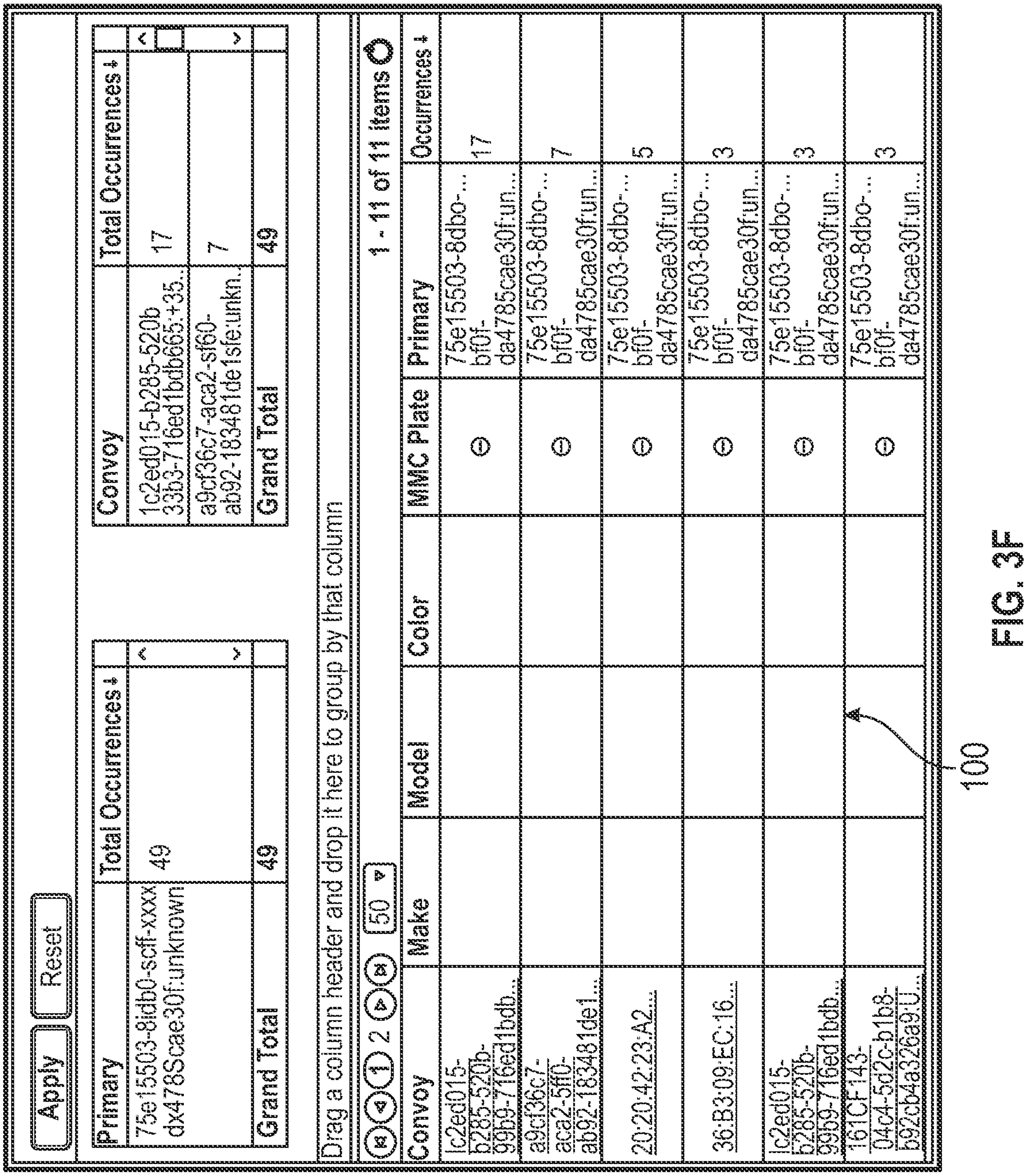
Figure 3G:
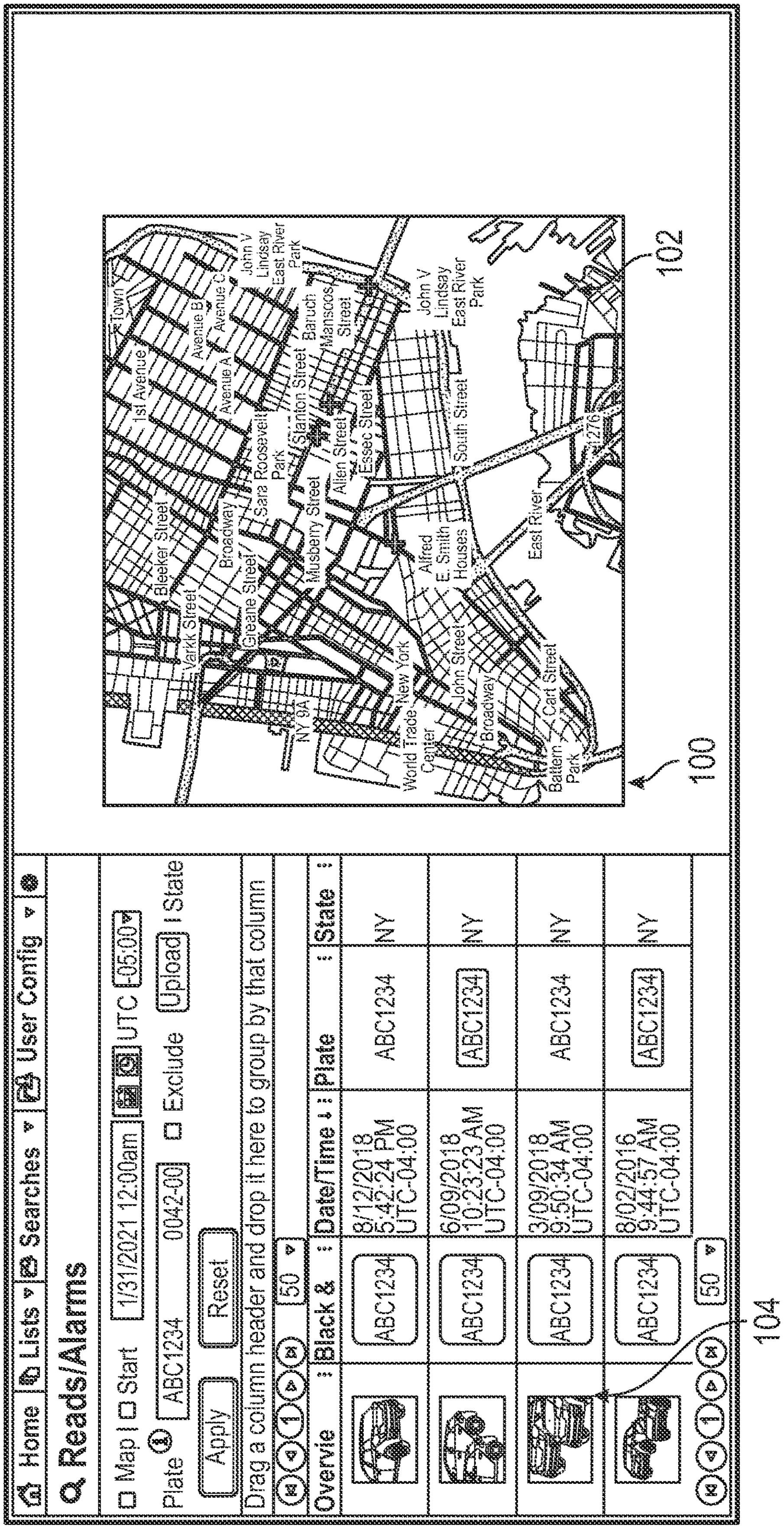

In addition, or in the alternative, the search results can include groupings or listings 104 of search results associating the one or more electronic signatures searched with information related to the collection systems 12 which captured electronic signals associated with the one or more electronic signatures searched (FIGS. 3C and 3G). The grouping or listing 104 can include images captured (e.g., images of the person, vehicle, vehicle license plate, etc.), temporal information (e.g., the date and time the visual or signal information was collected), the visual identifier (e.g., license plate number), location information (e.g., GPS coordinates, state, city, etc.), information identifying the collection point system, statues of the collection (e.g., normal read, error, etc.), etc.

In other embodiments, the surveillance system 10 can be configured to allow for labeling or other associating of specific electronic signatures with a selected target or targets and then alert or search for history of those specific electronic signatures in the intelligence database, placing the selected target(s) at more locations than ALPR alone. For example, an investigator can determine an electronic signature or electronic signatures that are associated with a target 11, e.g., using readings of electronic signals from transmitting electronic devices possessed by suspect taken into custody or other capture of electronic signals from a suspect's transmitting electronic devices. The investigator then can input the electronic signatures (or information related thereto) associated with the target(s) into the surveillance system 10 to determine which collection systems 12 captured those signatures, e.g., to establish a verifiable record/proof that the suspect or others were at or near a crime scene and/or show other incriminating movements or locations of the suspect, such as a location or movements patterns useful for tracking the commission of a crime. Investigators further can input specific time periods or ranges, and the surveillance system 10 can provide listings of electronic signatures or visual identifiers received at various collection systems 12 within the inputted time period/range or can provide maps or other images showing movements of targets 11 within the inputted time period based on their electronic signatures received at the collection systems 12. By use of such a system, investigators potentially can be aided in reducing or narrowing a pool of suspects, aiding their investigations.

In addition, the surveillance system 10 can generate an alarm or alert when the specific electronic signature(s) is captured at one or more of the collection point systems 12 to alert of the presence of the target(s) 11 at or near the collection point system(s) 12. The alarm or alert can be provided to the operator of the surveillance system 10 and/or local authorities, e.g., law enforcement or other third parties. In some embodiments, the target 11 can be selected based on a specific criteria associated with the target 11, e.g., arrest warrant, Amber or Silver Alert, expired registration, immigration violation, etc., and when the labeled electronic signatures are collected at one or more of the collection systems 12, the proper authorities can be notified.

The surveillance system 10 further can be configured to perform convoy searches or analyses that indicate transmitting electronic devices, i.e., based on their electronic signatures, which typically travel with a vehicle license plate, as generally indicated in FIGS. 3D-3F. For example, as FIGS. 3D-3F show, the surveillance system 100 may provide listings of electronic signatures that are commonly associated with a target's license plate. An investigator may perform searching on one or more of the associated electronic signatures apart from the target's license plate to pick up locations a target may have traveled when the license plate was not read, e.g., to expand the search of a particular target's movements apart from a vehicle, to pick up location data for a vehicle with a license plate may have been tampered with or otherwise is unreadable/not read. For example, an investigator may have noticed that a particular vehicle's license plate has been picked up 20 times and 19 of those 20 times a particular, unique RFID electronic signature also was received, so the surveillance system 10 allows the investigator to look for where else the unique RFID electronic signature was received, e.g., to be able to track a person in places that did not read or pick up their vehicle's license plate to expand the investigation.

In still further embodiments, the surveillance system 10 further can indicate or determine changes in association or travel of suspects based on variations in electronic signatures associated with a target. For example, based on unique electronic signatures, the surveillance system 10 can indicate whether particular individuals are or were traveling with a particular vehicle or vehicles, which can allow investigators to determine whether suspects were actually in a vehicle at a particular time. In addition, the surveillance system 10 can indicate whether the sought after individual or third party by standers are in a vehicle or other structure based on the electronic signatures associated therewith.

Figure 4:
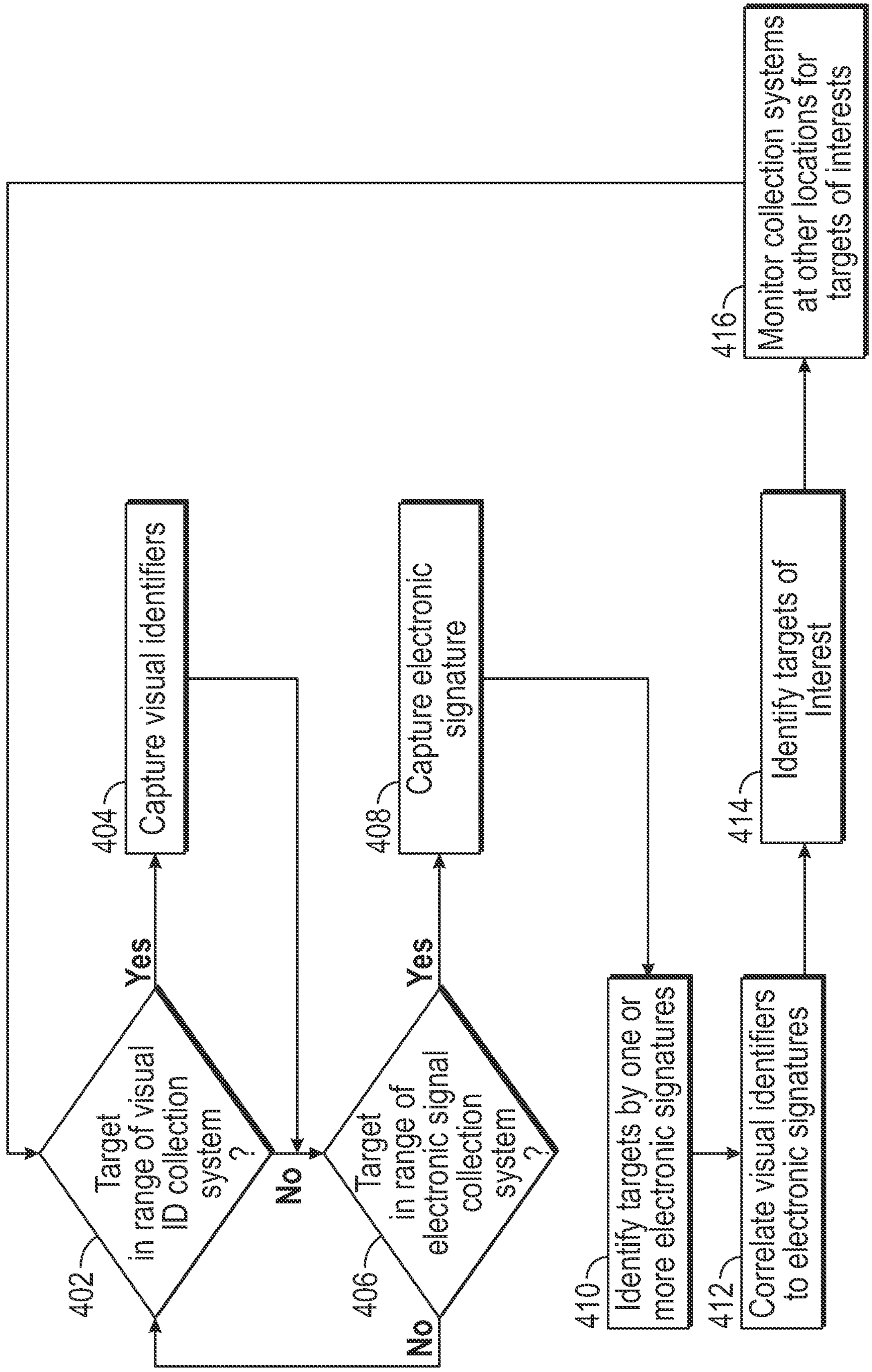
FIG. 4 is a flow diagram illustrating operation of a surveillance system according embodiments of the present disclosure.

FIG. 4 illustrates a method for operating the surveillance system 10 according to an embodiment of the present disclosure. Unless otherwise specified, the actions of method 400 may be completed within a controller computing device, processor, or other component of the surveillance system. The method illustrated in FIG. 4 also may be implemented in other systems and/or computing devices as will be understood by those skilled in the art. In addition, method 400 may be included in one or more programs, protocols, or instructions loaded into the memory of the surveillance system and executed by the controller computing device or by a processor or one or more processors of the surveillance system. The order in which the operations are described is not intended to be construed as a limitation, and any number of the described blocks may be combined in any order and/or in parallel to implement the methods.

As discussed above, the surveillance system will include a plurality of collection systems. Each of the collection systems can include a sensor, camera, or other device capable of determining whether a target is in proximity to the surveillance system, and capturing identifying information for such target. Each of the collections systems further will be located at a known or selected location (e.g. at known GPS coordinates) and, as indicated at 402-406, if a target is detected to be within range of one or more collection systems the collections systems will capture identifying information associated with the target and will transfer such captured identifying information for each such target detected to the controller computing device or other controller of the surveillance system.

As indicated at blocks 402 and 406, each collection system will search for targets coming within a range of detection thereof. Each of the collection systems can make such a determination of a target coming within its range of detection based on various visual identifiers (e.g. Automated License Plate Reader captures of vehicle plates, make & model, or other visual identifiers), or based on capture of electronic signals defining one or more electronic signatures associated with each target. One or more collection systems can be located in proximity to each other such that a target can be identified by captured visual indicators, by electronic signature(s), or a combination thereof. For example, as indicated at block 402, a visual ID collection system (e.g. an ALPR system) will search for targets coming within its range of detection, and if a target is found to be/come in range, a visual identifier of the target will be captured as shown in block 404. In an embodiment, such a capture may include a picture, photo, image, or other action which records a visual identifier of a target. The target, in such examples, may include a vehicle or person. Once the collection system captures the visual identifier, the collection system may transfer the capture to the surveillance system.

If a target is not in range of the visual ID collection system, or after the visual identifier is captured, the surveillance system may determine whether a device is in range of an additional collection system, such as an electronic signal collection system, as indicated at block 406. The electronic signal collection system may include an antenna or other means for detecting different types of electronic signals. For example, the antenna may detect a Wifi or Bluetooth signal. In such examples, the simple detection of such signals may be sufficient to indicate that a target or device is in range and corresponding electrical signal may be captured.

At block 408, if the device is within range of the electronic signal collection system, the electronic signal collection system will capture one or more electronic signals emanating from the target or an electronic device with the target, which signals will be used to define the electronic signature of the target or target device. In an embodiment, the collection system may transmit a request to the target device and store the corresponding response or relevant data within the response as an electronic signature (e.g., the electronic signature including data describing or identifying the device). In another embodiment, the detected signal from the device may include relevant information. As such, the collection system may detect the signal and then store the signal from the device in the surveillance system. In another embodiment, the collection system may parse and/or transmit relevant data from such a signal to the surveillance system.

At block 410, the surveillance system may identify targets by the one or more electronic signature. The surveillance system may analyze the captured data in relation to different targets and/or devices. The surveillance system may determine based on time, proximity, and number of occurrences whether a device is associated with a target and, in some examples, identify the target. In other words, the surveillance system may utilize a number of found electronic signatures typically associated with a particular target to identify that particular vehicle.

At block 412, the surveillance system will correlate visual identifiers to the electronic signature of the target. The surveillance system may review or analyze the visual identifiers and electronic signatures captured at particular times, places, and/or proximity to the collection system. Based on such captured data, the surveillance system may associate one or more of the captured electronic signatures with a particular target. For example, a set of Bluetooth headphones may be detected at a particular time and place every day. Further, a vehicle's identifying patterns (e.g., stickers, dents, etc.) may be captured at that same particular time and place. As such, the surveillance system may generate an indicator to be stored along with the captured electronic signature and the capture vehicle identifier. The indicator may indicate that the headphones are associated with that particular vehicle.

At block 414, the surveillance system may determine targets of interest. Many (e.g., hundreds or thousands) signals and images may be captured over a short period of time. Many of these data points may not be relevant or may be of targets which are not of interest. The surveillance system may identify a target of interest from such daily gathered data based on known target identifiers (e.g., license plate number or identifying marks on a vehicle on a stolen or watch/hot list). The data related to a target of interest may be stored and saved for potential analysis, while the remaining data may be deleted or not stored in the surveillance system.

At block 416, the surveillance system further will monitor the plurality of collection systems for captured signals or images associated with identified targets of interest. The surveillance system will receive additional data points from collection systems at other known or selected locations for detection of such identified targets of interest at such additional locations. Movement of such targets of interest between a series of known locations can be determined both in real-time, and to develop a historical record of such movements. In an embodiment, the surveillance system may include a number of targets of interest. The surveillance system may track each over a particular period of time or otherwise.

The foregoing description generally illustrates and describes various embodiments of the present disclosure. It will, however, be understood by those skilled in the art that various changes and modifications can be made to the above-discussed construction of the present disclosure without departing from the spirit and scope of the disclosure as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present disclosure. Accordingly, various features and characteristics of the present disclosure as discussed herein may be selectively interchanged and applied to other illustrated and non-illustrated embodiments of the disclosure, and numerous variations, modifications, and additions further can be made thereto without departing from the spirit and scope of the present disclosure as set forth in the appended claims.

What is claimed is:

1. A system for collecting and correlating identifying information for surveillance and tracking, comprising:

a plurality of collection systems located within a geographic area, one or more of the plurality of collection systems comprising visual ID collection systems having one or more sensors configured to capture visual identifiers of a plurality of targets, and one or more of the plurality of collection systems comprising electronic signal collection systems having one or more sensors configured to capture electronic signatures, wherein the electronic signatures are based on electronic signals emanating from one or more types of electronic devices carried by or associated with one or more targets of the plurality of targets;

wherein each of the plurality of collection systems is configured to determine GPS or other location data, a time of capture, or combinations thereof, for each capture of an electronic signature or a visual identifier; and an intelligence system in communication with the plurality of collection systems, the intelligence system configured to:

receive, from the plurality of collection systems, the information related to the visual identifiers and the electronic signatures;

determine a relationship between one or more of the visual identifiers captured by one or more of the visual ID collection systems for at least one target of the plurality of targets and at least one electronic signature from the electronic devices carried by or associated with the one or more targets captured by one or more of the electronic signal collection systems;

wherein the relationship is based on a correlation of a frequency of capture and amount of captures of one or more of the visual identifiers and the one or more electronic signatures, and a selected proximity of capture of the one or more of the visual identifiers and one or more identified electronic signatures to one or more selected collection systems;

determine, based on the relationship, one or more of a previous location or a frequent location within a prescribed area at which a visual indicator and a correlated electronic signal are matched to enable tracking of targets;

search for captures of electronic signatures of at least one of the one or more electronic devices and related visual identifiers associated with one or more targets of interest by one or more of the electronic signal collection systems and visual ID collection systems;

search for captures of the electronic signatures of the at least one of the one or more electronic devices by at least one electronic signal collection system where one or more visual identifiers associated with the one or more targets of interest are not captured by a visual ID collection system; and generate a record of movement or location patterns of the one or more targets of interest, a verification of the one or more targets of interest at a location, or combinations thereof, within the prescribed area and within an inputted time period.

2. The system of claim 1, wherein at least some of the plurality of collection systems comprise an automated license plate reader.

3. The system of claim 1, wherein at least some of the plurality of collection systems comprise an array of sensors each configured to detect and capture one or more electronic signals associated with the electronic devices.

4. The system of claim 3, wherein the array of sensors includes one or more of a Bluetooth® antenna, a Wifi antenna, a RFID antenna, or other RF antenna.

5. The system of claim 1, wherein the plurality of collection systems further comprise one or more cameras, configured to capture the visual identifiers.

6. The system of claim 5, wherein the visual identifiers include one or more of license plates, stickers, patterns, position(s) of component parts, after-market added parts, damage, and various other markings relating to a vehicle.

7. The system of claim 1, wherein the intelligence system further comprises a classification and search engine configured to determine relationships between an identified electronic device generating captured electronic signals and one or more visual identifiers of a vehicle, and a location and time of receipt of at least one electronic signature for the vehicle.

8. The system of claim 7, wherein each of the plurality of collection systems is configured to transmit the GPS or other location data, the time of capture, or combinations thereof for each capture with the information related to visual identifiers and at least one electronic signal transmitted to the intelligence system.

9. The system of claim 1, wherein the intelligence system further comprises a user interface.

10. The system of claim 9, wherein the user interface comprises one or more displays configured to display one or more of visual identifiers and electronic signatures associated with at least one identified vehicle, relationships between the at least one identified vehicle and one or more electronic devices associated with the electronic signatures, or routes or predicted routes of the at least one identified vehicle.

11. A method of identifying and tracking targets, comprising:

capturing, via a plurality of collection systems, one or more visual identifiers of a plurality of vehicles and one or more electronic signatures of one or more electronic devices carried by at least one target associated with each of the plurality of vehicles;

wherein the plurality of collection systems includes a plurality of visual ID collection systems configured to capture the visual identifiers of the vehicles, and a plurality of electronic signal collection systems configured to capture the electronic signals of the one or more electronic devices;

wherein each of the plurality of collection systems is configured to determine GPS or other location data, a time of capture, or combinations thereof, for each capture of the one or more visual identifiers and the one or more electronic signatures;

transmitting the one or more visual identifiers and the one or more electronic signatures to an intelligence system, wherein the intelligence system is configured to:

correlate at least one of the one or more visual identifiers with at least one electronic signature of the one or more electronic signatures and a location and time of capture of the at least one electronic signature;

wherein the correlation is based on amount of captures of the one or more visual identifiers and the one or more electronic signatures within a selected proximity; and determine associations between each of the vehicles with one or more electronic devices identified with one or more of real-time captures of the visual identifiers and electronic signatures;

using the intelligence system, performing convoy searches to identify one or more electronic devices with at least one vehicle of the one or more of the vehicles based the associations between the one or more vehicles and at least one electronic device of the one or more electronic devices;

determine, based on the associations, one or more locations within prescribed area at which a visual identifier of the at least one vehicle associated with the target of interest and a correlated electronic signature of the at least one electronic device are matched to enable tracking of targets, location of targets, verification of targets at a location, or combinations thereof;

search for captures of the correlated electronic signature of the at least one electronic device and one or more visual identifiers of a vehicle associated with one or more targets of interest by one or more collection systems within the prescribed area; and when one or more visual identifiers associated with the one or more targets of interest are not captured by a visual ID collection system, search for captures of the correlated electronic signature of the at least one electronic device by at least one electronic signal collection system to enable tracking, placement, or combinations thereof of the one or more target of interests at one or more locations where a visual identifier of the vehicle is not captured by a visual ID collection system.

12. The method of claim 11, wherein the real-time updated captures comprise captures of the visual identifiers and electronic signatures from electronic devices associated therewith at successive times and locations.

13. The method of claim 11, further comprising displaying, via a user interface in communication with the intelligence system, real-time geographic locations of the identified vehicles.

14. The method of claim 13, further comprising displaying, via the user interface in communication with the intelligence system, the associations between the visual identifiers and electronic signatures from electronic devices.

15. The method of claim 11, wherein capturing the visual identifiers and electronic signatures of a plurality of electronic devices comprises capturing an image of a vehicle license plate with a license plate reader; and capturing transmitted electronic signals with a Bluetooth® antenna, a Wifi antenna, a RFID antenna, RF antenna, or combinations thereof.

16. The method of claim 11, wherein the at least one target comprises one or more vehicles and one or more people.

17. The system of claim 1, wherein the plurality of targets comprises one or more vehicles and one or more people.

18. The system of claim 9, wherein the user interface comprises one or more displays configured to display a user selectable alarm to create an alert for a specific electronic signature, and the intelligence system is further configured to: generate an alarm when the specific electronic signature is captured at one or more of the plurality of collection systems to alert of a presence of the target.

19. The system of claim 9, wherein the user interface comprises one or more displays configured to display one or more of a previous location or a frequent location of one or more targets about a prescribed location or area.

20. The system of claim 1, wherein the intelligence system is configured to:

determine two or more targets are associated based on a proximity of at least two electronic signatures from the electronic devices carried by or associated with two or more targets captured by the plurality of collection system.

* * * * *